(12) United States Patent
Kaji

(10) Patent No.: US 7,530,864 B2
(45) Date of Patent: May 12, 2009

(54) CONTROL APPARATUS FOR HYBRID TYPE OUTBOARD MOTOR, MARINE VESSEL RUNNING SUPPORT SYSTEM AND MARINE VESSEL USING THE SAME

(75) Inventor: Hirotaka Kaji, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/937,004

(22) Filed: Nov. 8, 2007

(65) Prior Publication Data

US 2008/0113569 A1 May 15, 2008

(30) Foreign Application Priority Data

Nov. 10, 2006 (JP) ............................. 2006-305608

(51) Int. Cl.
*B63H 21/22* (2006.01)
(52) U.S. Cl. ......................................................... 440/1
(58) Field of Classification Search .................. 440/1
See application file for complete search history.

(56) References Cited

U.S. PATENT DOCUMENTS 7,306,496 B1 * 12/2007 Carmen et al. ................ 440/6

2007/0068163 A1 * 3/2007 Ishikawa et al. .............. 60/700

FOREIGN PATENT DOCUMENTS

| JP | 62-146799 A | 6/1987 |
|---|---|---|
| JP | 2001-18892 A | 1/2001 |
| JP | 2001-270495 A | 10/2001 |
| JP | 2003-80955 A | 3/2003 |
| JP | 2004-255972 A | 9/2004 |
| JP | 2004-257294 A | 9/2004 |
| JP | 2007-8329 A | 1/2007 |

OTHER PUBLICATIONS

Kaji; "Control Apparatus for Outboard Motor, and Marine Vessel Running Support System and Marine Vessel Using the Same"; U.S. Appl. No. 11/937,040, filed Nov. 8, 2007.

* cited by examiner

*Primary Examiner*—Stephen Avila
(74) *Attorney, Agent, or Firm*—Keating & Bennett, LLP

(57) ABSTRACT

A hybrid type outdoor motor includes a propeller, an electric motor that generates a drive force to rotate the propeller, and an engine that generates a drive force to rotate the propeller. The engine discharges exhaust gas in water. A control apparatus that controls the hybrid type outboard motor includes a speed instruction unit arranged to generate a speed instruction value indicative of the rotational speed of the propeller, and a control unit arranged to change from a first mode, in which only the drive force of the electric motor is transmitted to the propeller, to the second mode, in which the drive force of the engine is transmitted to the propeller. The control unit changes from the first to second modes depending on a rotation direction of the propeller and the speed instruction value generated by the speed instruction unit.

11 Claims, 14 Drawing Sheets

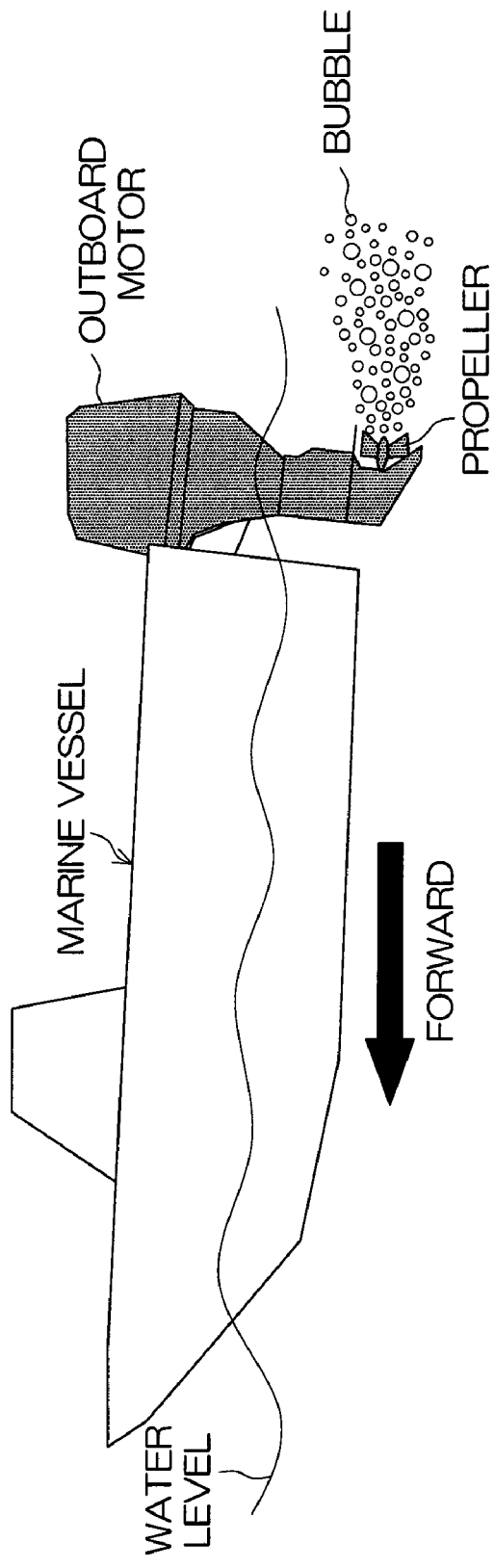
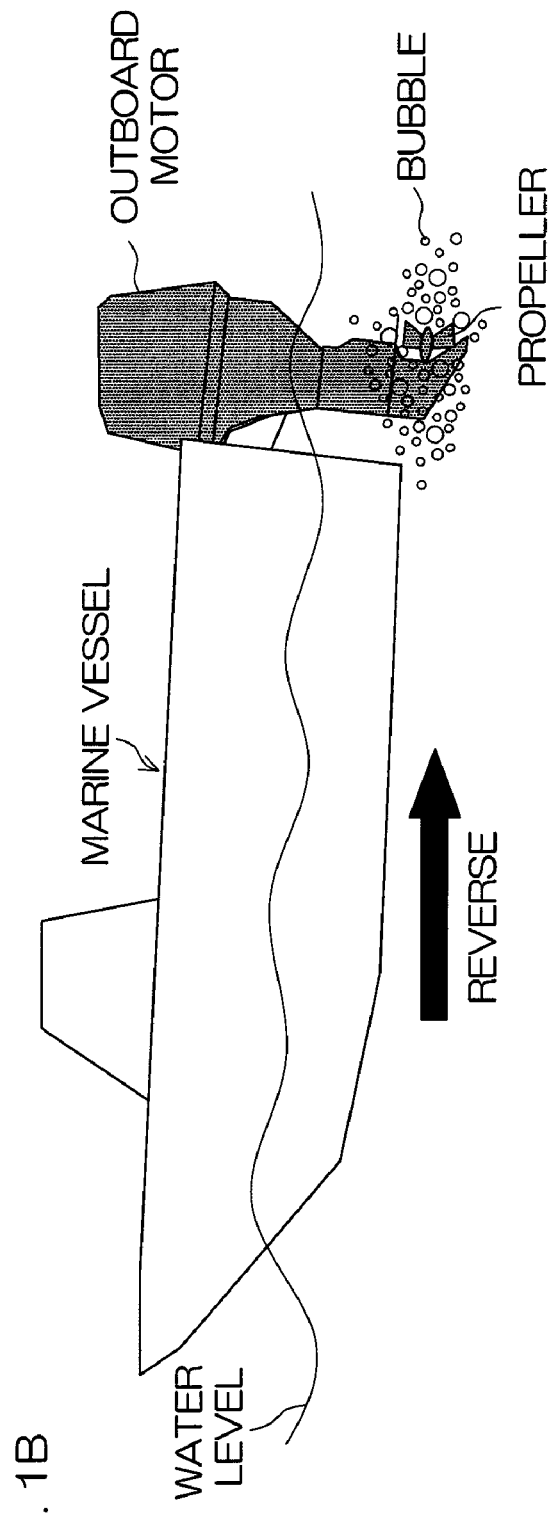
FIG. 1A
FIG. 1B

CONTROL APPARATUS FOR HYBRID TYPE OUTBOARD MOTOR, MARINE VESSEL RUNNING SUPPORT SYSTEM AND MARINE VESSEL USING THE SAME

BACKGROUND OF THE INVENTION

1. Field of the Invention

The present invention relates to a control apparatus that controls a hybrid type outboard motor equipped with an electric motor as a drive source to rotate a propeller and an engine which performs exhaust in the water, and a running support system and a marine vessel using such a control apparatus.

2. Description of Related Art

An outboard motor is one type of propulsion systems for marine vessels that provides a propulsive force to a marine vessel. In the outboard motor, a motor that generates a drive force to rotate a propeller is disposed outboard.

In addition, a so-called hybrid type motor equipped with both an engine and an electric motor has been proposed. A hybrid system disclosed in Japanese Unexamined Patent Publication No. 2004-257294 is devised so that both of an engine and an electric motor are driven or only one of the engine and the electric motor is driven, and the drive force thereof causes a propeller to rotate. Furthermore, in the hybrid system, where both the engine and the electric motor are driven, the output of the electric motor is regulated based on the operating speed and operating time of an operation lever operated for steering, and an opening degree of a throttle and rotation fluctuation time of the engine.

In a marine vessel including an outboard motor that uses a hybrid motor (herein after called a "hybrid type outboard motor"), the propeller is rotated only by a drive force of an electric motor, for example, at very low running speeds. This is because a required propulsive force is so low that it cannot be properly output unless the rotational speed of the engine is set to be less than the idling rotational speed of the engine. On the other hand, as the running speed of a marine vessel exceeds a predetermined value, the drive force of the engine is transmitted to the propeller since the rotational speed of the engine corresponding to a required propulsive force exceeds the idling rotational speed.

In a conventional outboard motor, where the engine is driven, an exhaust gas is exhausted in the water through an in-water exhaust port provided at the boss part of the propeller. This is called "in-water exhaust."

FIG. 1A is a conceptual view describing the in-water exhaust, which shows a forward running state of a marine vessel. FIG. 1B is a conceptual view describing the in-water exhaust, which shows a reverse running state of a marine vessel. In a state in which an operator operates the operating lever in the forward direction, and the marine vessel runs forward, as shown in FIG. 1A, the propeller is rotated in the direction along which water is pushed out astern. Therefore, bubbles of exhaust gas exhausted in the water move backwards. However, as the marine vessel moves backward in response to the operator's operation of the operating lever in the reverse (backward) direction, the propeller rotates in water containing bubbles as a result of the exhaust (see FIG. 1B). At this time, "bubble entrainment" occurs, by which the propeller drags or entrains bubbles. Therefore, since the water amount pushed out by the propeller is substantially reduced, the propulsion efficiency is reduced accordingly. That is, it becomes impossible to obtain a propulsive force corresponding to the rotational speed of the propeller. Furthermore, since the exhaust amount from the engine is increased in accordance with an increase in the rotational speed of the propeller, the bubble entrainment is substantially increased in response thereto. Accordingly, the higher the rotational speed becomes, the greater the degree of reduced propulsive force resulting from the bubble entrainment becomes.

On the other hand, since no in-water exhaust occurs when the propeller is driven by only an electric motor with the engine stopped, the propulsive force is not reduced due to bubble entrainment. For this reason, in a hybrid type outboard motor, when moving a marine vessel backward, at the time of shifting from a state in which the propeller is rotated only by an electric motor to a state in which the propeller is rotated by the engine, there is a concern that the propulsive force may become discontinuous. Therefore, there is a possibility that an operator and other passengers will experience uncomfortable feelings.

In particular, since a marine vessel runs at a low speed when arriving at or leaving a shore or trolling, the state of the hybrid type outboard motor is frequently changed between a state in which the propeller is driven only by an electric motor and a state in which a drive force of an engine is transmitted to the propeller. Thus, uncomfortable feelings experienced by passengers due to discontinuance of the propulsive force are increased.

SUMMARY OF THE INVENTION

To overcome the problems described above, a preferred embodiment of the present invention provides a control apparatus to control a hybrid type outboard motor including a propeller, an electric motor to generate a drive force to rotate the propeller, and an engine that generates a drive force to rotate the propeller. The engine includes an in-water exhaust. The control apparatus includes a speed instruction unit arranged to generate a speed instruction value indicative of a rotational speed of the propeller, and a control unit arranged to change among a plurality of modes including a first mode and a second mode. In the first mode, only the drive force of the electric motor is transmitted to the propeller in accordance with the rotation direction of the propeller and the speed instruction value generated by the speed instruction unit. In the second mode, the drive force of the engine is transmitted to the propeller. An other mode may be provided. Examples of such a mode include: a mode in which the drive force of neither the electric motor nor the engine is transmitted to the propeller, a mode in which the drive force of an other drive source is transmitted to the propeller, and a mode in which no drive force is transmitted to the propeller.

According to this preferred embodiment, the control unit changes between the first mode and the second mode based on not only the speed instruction value generated by the speed instruction unit but also the rotation direction of the propeller. In the first mode, since only the drive force of the electric motor is transmitted to the propeller, bubble entrainment is not a problem. On the contrary, since, in the second mode, the drive force of the engine is transmitted to the propeller, it is necessary to take the influences due to bubble entrainment into consideration. On the other hand, where the rotation direction of the propeller is a direction in which bubbles generated by in-water exhaust are dragged or entrained to the propeller, bubble entrainment occurs and caused reduced propulsion efficiency. On the contrary, if the rotation direction of the propeller is a direction along which bubbles generated by in-water exhaust are moved away from the propeller, the bubble entrainment does not substantially occur. Therefore, a propulsive force corresponding to the rotational speed of the propeller can be easily obtained. Accordingly, in preferred embodiments of the present invention, when the first mode and the second mode are changed depending on a speed instruction value, the rotation direction of the propeller is taken into consideration. Therefore, it is possible to perform changing between the first mode and the second mode so as to suppress uncomfortable feelings resulting from reduced propulsion efficiency due to bubble entrainment.

It is preferable that the control unit is arranged to change from the first mode to the second mode by applying a different threshold value to a speed instruction value generated by the speed instruction unit depending on the rotation direction of the propeller.

According to this construction, the control unit applies a different threshold value to the speed instruction value depending on the rotation direction of the propeller, and changes from the first mode to the second mode based on the threshold value. That is, individual threshold values are set depending on whether the rotation direction of the propeller is a direction along which the propulsive force is reduced due to bubble entrainment or a direction along which the propulsive force is not reduced due to bubble entrainment. Therefore, it is possible to reduce uncomfortable feelings accompanied by reduced propulsive force due to bubble entrainment.

It is preferable that the control unit uses a first threshold value when the rotation direction of the propeller is a first rotation direction along which the in-water exhaust of the engine is moved away from the propeller, and uses a second threshold value, which is greater than the first threshold value, when the rotation direction of the propeller is a second rotation direction along which the in-water exhaust of the engine is dragged or entrained to the propeller.

With this construction, when the rotation direction of the propeller is the first rotation direction along which bubble entrainment does not substantially occur, the first threshold value that is comparatively small is used, whereby since the first mode in which the propeller is driven only by an electric motor is suppressed, power consumption is reduced. On the other hand, when the rotation direction of the propeller is the second rotation direction along which bubble entrainment occurs, the second threshold value that is comparatively large is adopted. Therefore, it is possible to effectively suppress influences resulting from reduced propulsive force due to bubble entrainment.

It is preferable that the control apparatus further includes a direction instruction unit that generates a direction instruction indicative of the rotation direction of the propeller. In this case, it is preferable that the control unit includes a rotation direction judging unit arranged to determine the rotation direction of the propeller based on a direction instruction generated by the direction instruction unit.

According to this construction, the rotation direction judging unit determines the rotation direction of the propeller based on a direction instruction generated by the direction instruction unit. Therefore, it is possible to easily determine whether the rotation direction of the propeller is a direction along which bubble entrainment occurs.

When the rotation direction of the propeller is the first rotation direction along which the in-water exhaust of the engine is moved away from the propeller, the control unit may use the first mode when the speed instruction value generated by the speed instruction unit is the first threshold value or less, and may use the second mode when the speed instruction value generated by the speed instruction unit is greater than the first threshold value. In this case, when the rotation direction of the propeller is the second rotation direction along which the in-water exhaust of the engine is dragged to the propeller, the control unit preferably uses the first mode when the speed instruction value generated by the speed instruction unit is the second threshold value (which is greater than the first threshold value) or less, and preferably uses the second mode when the speed instruction value generated by the speed instruction unit is greater than the second threshold value.

When the rotation direction of the propeller is the first rotation direction along which in-water exhaust is moved away from the propeller, bubble entrainment does not occur, whereby the propulsive force is not reduced due to bubble entrainment. On the other hand, when the rotation direction of the propeller is the second direction along which in-water exhaust is dragged or entrained to the propeller, bubble entrainment occurs, whereby the propulsive force is reduced due to the bubble entrainment. When the rotation direction of the propeller is a direction along which the propulsive force is not reduced due to bubble entrainment, the control unit changes the mode from the first mode to the second mode when the speed instruction value is greater than the first threshold value. On the other hand, when the rotation direction of the propeller is a direction along which the propulsive force is reduced due to bubble entrainment, the control unit changes the mode from the first mode to the second mode when the speed instruction value is greater than the second threshold value that is greater than the first threshold value. That is, when the rotation direction of the propeller is a direction along which reduced propulsive force occurs due to bubble entrainment, the propeller is driven only by an electric motor until the speed instruction value is increased (that is, until it is greater than the second threshold value). Therefore, when a marine vessel is steered at a low speed zone such as when arriving at or leaving from a shore, or trolling, the frequency of changing from the first mode to the second mode is decreased, whereby it is possible to suppress uncomfortable feelings experienced by passengers due to discontinuance of the propulsive force. In addition, when the rotation direction of the propeller is the first rotation direction, the first threshold value that is comparatively small is used. Accordingly, the first mode in which the propeller is rotated only by an electric motor is suppressed, whereby power consumption is reduced.

When the direction instruction unit that generates a direction instruction indicative of the rotation direction of the propeller is further included, the following construction can be used. That is, when the direction instruction generated by the direction instruction unit indicates the first rotation direction, the control unit may use the first mode when the speed instruction value is the first threshold value or less, and may use the second mode when the speed instruction value is greater than the first threshold value. Further, it is preferable that, when the direction instruction generated by the direction instruction unit indicates the second rotation direction, the control unit uses the first mode when the speed instruction value is the second threshold value or less, and uses the second mode when the speed instruction value is greater than the second threshold value.

According to this construction, the control unit can easily obtain information regarding the rotation direction of the propeller based on a direction instruction generated by the direction instruction unit. The information regarding the rotation direction of the propeller means, in detail, information indicating whether the rotation direction of the propeller is the first rotation direction along which the propulsive force is not reduced due to bubble entrainment or the second rotation direction along which the propulsive force is reduced due to bubble entrainment.

The first rotation direction may be the forward direction in which a propulsive force in the forward direction is provided to a marine vessel, and the second rotation direction may be the reverse direction in which a propulsive force in the reverse direction is provided to a marine vessel.

The frequency at which a marine vessel is run in the reverse direction is less than that the frequency at which a marine vessel is run in the forward direction. Also, when an outboard motor generates a propulsive force in the forward direction, bubble entrainment does not substantially occur. Therefore, setting the first threshold value corresponding to the forward direction relatively small, it is possible to suppress drive of the propeller only by an electric motor, whereby power consumption is reduced.

In-water exhaust of the outboard motor may be discharged astern of a marine vessel. In this case, since in-water exhaust is discharged astern of a marine vessel, bubble entrainment does not substantially occur when the marine vessel is run in the forward direction, however, bubble entrainment is likely to occur when the marine vessel is run in the reverse direction. Therefore, by setting the first threshold value corresponding to the forward direction to a small value, it is possible to suppress the drive of the propeller by an electric motor, whereby power consumption is reduced. On the other hand, by setting the second threshold value corresponding to the reverse direction to a large value, it is possible to prevent influences resulting from reduced propulsive force due to bubble entrainment.

The control apparatus may further include an electric motor rotational speed setting unit arranged to set a target rotational speed of the electric motor such that the propulsive force generated by the propeller is continuous before and after changing from the first mode to the second mode.

According to this construction, the electric motor rotational speed setting unit sets a target rotational speed of an electric motor so as to compensate for reduced propulsion efficiency due to bubble entrainment. For this reason, when changing from the first mode to the second mode, it is possible to suppress the reduced propulsive force due to bubble entrainment. Therefore, uncomfortable feelings experienced by passengers can be further prevented.

In a state in which the propeller is driven by an engine, the propulsive force generated thereby differs even at the same rotational speed depending on whether bubble entrainment occurs. Therefore, for example, when the rotation direction of the propeller is a direction along which bubbles generated by in-water exhaust are dragged to the propeller, the electric motor rotational speed setting unit sets the target rotational speed to a lower speed than when the rotation direction is opposite thereto, whereby the propulsive force is suppressed. In further detail, for example, in determining the target rotational speed to be applied when the rotation direction of the propeller is the direction along which in-water exhaust is dragged thereto, the electric motor rotational speed setting unit determines such target rotational speed by multiplying, by a correction coefficient less than about 1.0, the target rotational speed applied when the rotation direction of the propeller is the direction along which in-water exhaust is not dragged thereto. Therefore, when changing from the first mode to the second mode, the propulsive force generated by the propeller is continuous.

It is preferable that the control apparatus further includes an engine rotational speed setting unit arranged to set a target rotational speed of the engine such that the propulsive force generated by the propeller is continuous before and after changing from the first mode to the second mode.

According to this construction, the engine rotational speed setting unit sets a target rotational speed of the engine such that the propulsive force generated by the propeller is continuous when changing from the first mode to the second mode. For this reason, since it is possible to suppress reduced propulsive force when changing from the first mode to the second mode, uncomfortable feelings experienced by passengers can be further suppressed.

In a state in which the propeller is driven by an engine, the propulsive force generated thereby differs even at the same rotational speed depending on whether bubble entrainment occurs. Therefore, for example, when the rotation direction of the propeller is the direction along which bubbles generated by in-water exhaust are dragged thereto, the engine rotational speed setting unit sets the target rotational speed to a higher speed than when the rotation direction is opposite thereto. Thereby, reduced propulsive force due to bubble entrainment is compensated for. In detail, for example, the target rotational speed to be applied when the rotation direction of the propeller is the direction along which in-water exhaust is dragged thereto can be obtained by multiplying, by a correction coefficient greater than 1.0, the target rotational speed applied when the rotation direction of the propeller is the direction along which in-water exhaust is not dragged thereto. Thereby, it is possible to continue the propulsive force generated by the propeller when changing from the first mode to the second mode.

A running support system according to a preferred embodiment of the present invention includes a hybrid type outboard motor and the above-described control apparatus that controls the hybrid type outboard motor. The hybrid type outboard motor includes a propeller, an electric motor that generates a drive force to rotate the propeller, and an engine that generates a drive force to rotate the propeller and at the same time discharges exhaust gas in water.

According to this construction, drive of the propeller only by an electric motor (the first mode) and drive of the propeller by an engine (the second mode) can be appropriately changed so as to suppress uncomfortable feelings resulting from lowering in the propulsion efficiency due to bubble entrainment, whereby it is possible to reduce uncomfortable feelings given to passengers.

A marine vessel according to one preferred embodiment of the present invention includes a hull, a hybrid type outboard motor, and the above-described control apparatus that controls the hybrid type outboard motor. The hybrid type outboard motor includes a propeller, an electric motor that generates a drive force to rotate the propeller and an engine that generates a drive force to rotate the propeller and at the same time discharges exhaust gas in water.

According to the construction, drive of the propeller only by an electric motor (the first mode) and drive of the propeller by an engine (the second mode) can be appropriately changed over so as to suppress uncomfortable feelings resulting from lowering in the propulsion efficiency due to bubble entrainment, whereby it is possible to reduce uncomfortable feelings experienced by passengers.

The marine vessel may be a comparatively small-sized vessel such as a cruiser, a fishing boat, a water jet, and a watercraft, for example.

Other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a conceptual view for describing in-water exhaust, which shows a state in which a marine vessel runs in a forward direction.

FIG. 1B is a conceptual view for describing in-water exhaust, which shows a state in which a marine vessel runs in a reverse direction.

DETAILED DESCRIPTION OF PREFERRED EMBODIMENTS

Figure 2:
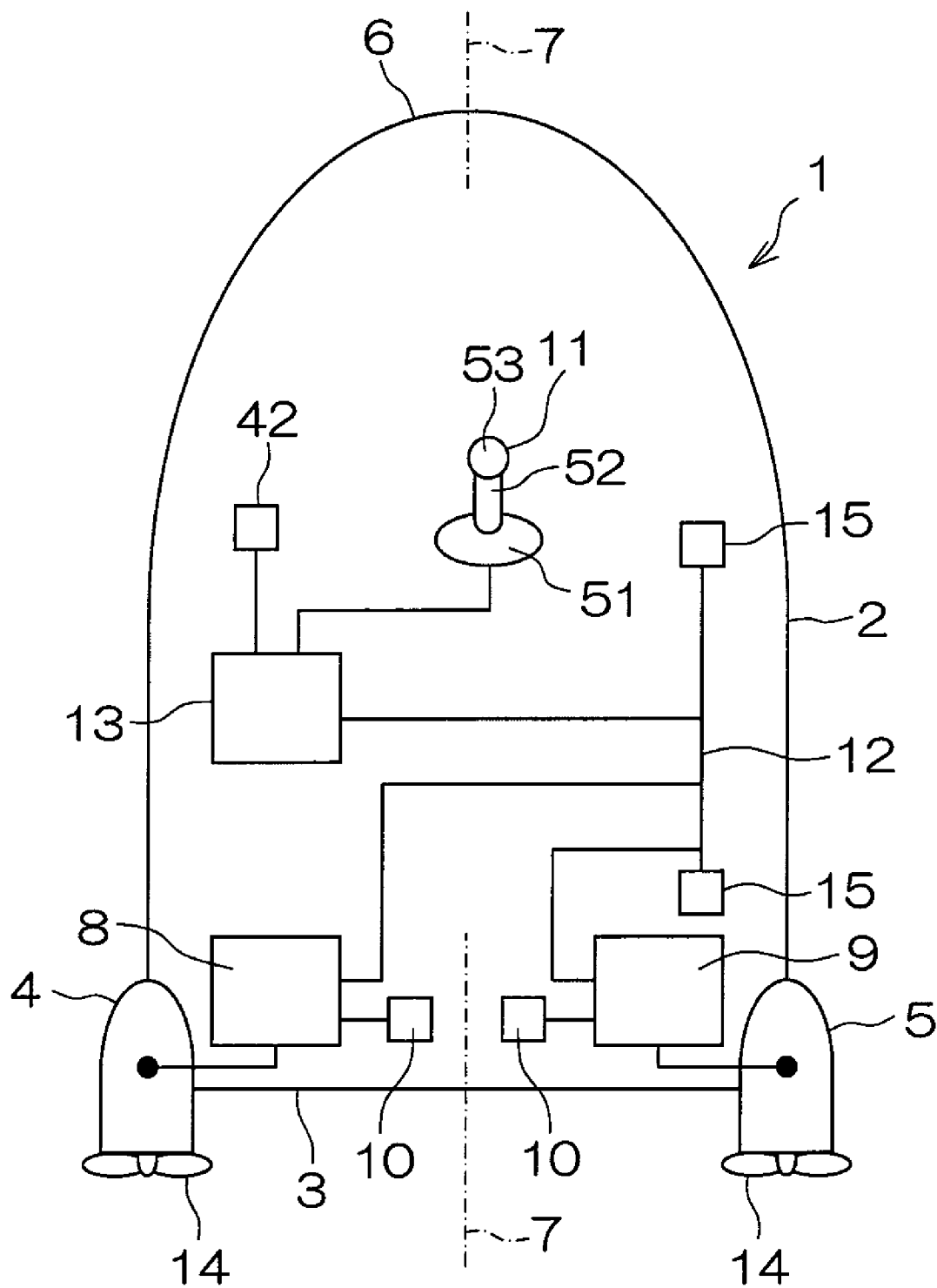
FIG. 2 is a conceptual view showing a configuration of a marine vessel according to a preferred embodiment of the present invention.

FIG. 2 is a conceptual view showing a configuration of a marine vessel 1 according to a preferred embodiment of the present invention. The marine vessel 1 includes a hull 2, and a pair of outboard motors 4 and 5 attached to a stern 3 of the hull 2.

The pair of outboard motors 4 and 5 are mounted at left-right symmetrical positions with respect to a centerline 7 passing through the stern 3 and a stern 6. In detail, the outboard motor 4 is attached to the port-side rear portion of the hull 2, and the outboard motor is attached to the starboard-side rear portion of the hull 2. Hereinafter, the outboard motors 4 may be called a "port-side outboard motor 4" and a "starboard-side outboard motor 5," respectively, in order to distinguish them.

The port-side outboard motor 4 and the starboard-side outboard motor 5 are provided with electronic control units (ECUs) 8 and 9 (herein after called a "port ECU 8" and a "starboard ECU 9" to distinguish them, and collectively called "outboard motor ECUs 8 and 9 or the like), respectively. Batteries 10 are connected to the port ECU 8 and the starboard ECU 9, respectively, and power is supplied from respective batteries 10 to the corresponding outboard motor ECUs and outboard motors. As described later, the outboard motors 4 and 5 are hybrid type outboard motors each driving a propeller by an internal combustion engine and an electric motor.

The hull 2 is provided with a lever 11 (that functions as a speed instruction unit and a direction instruction unit) operated to steer the marine vessel. By operating the lever 11, forward/reverse running and left/right turn of the marine vessel 1 are controlled. Information pertaining to operations of the lever 11 is provided to a marine vessel running controlling apparatus 13 via, for example, an inboard LAN 12 such as a CAN (Control Area Network) disposed in the marine vessel 2.

The marine vessel running controlling apparatus 13 preferably is an electronic control unit (ECU) including a microcomputer. The marine vessel running controlling apparatus 13 functions as a control apparatus to control the outboard motors 4 and 5, and controls a propulsive force and steering. In addition, the marine vessel running controlling apparatus 13 and the outboard motors 4 and 5 may be defined as a marine vessel running support system.

The marine vessel running controlling apparatus 13 provides communications via the inboard LAN 12 between the port ECU 8 and the starboard ECU 9. In detail, the marine vessel 13 obtains the rotational speeds of an engine and an electric motor provided in the respective outboard motors 4 and 5 and the steering angles that indicate the directions of the respective outboard motors 4 and 5 from the outboard motor ECUs 8 and 9. On the other hand, the marine vessel running controlling apparatus 13 provides data which indicate target rotation directions (forward directions or reverse directions) of the propellers 14 provided in the respective outboard motors 4 and 5, and target rotational speeds and target steering angles of the propellers 14, to the respective outboard motor ECUs 8 and 9. The rotational speed of the engine corresponds to the rotational speed of the propeller 14 on a one-to-one basis, and the rotational speed of the motor corresponds to the rotational speed of the propeller 14 on a one-to-one basis.

The hull 2 is provided with a speed sensor 42 that measures the running speed of the marine vessel 1. Data of the running speed of the marine vessel 1, which is measured by the speed sensor 42, is provided to the marine vessel running controlling apparatus 13 in real time. Hereinafter, when expressing the running speed of the marine vessel 1, for example, [+2 km/h] means that the forward running speed is 2 km per hour, and [−2 km/h] means that the reverse running speed is 2 km per hour. Reference numeral 15 denotes a terminator.

Figure 3:
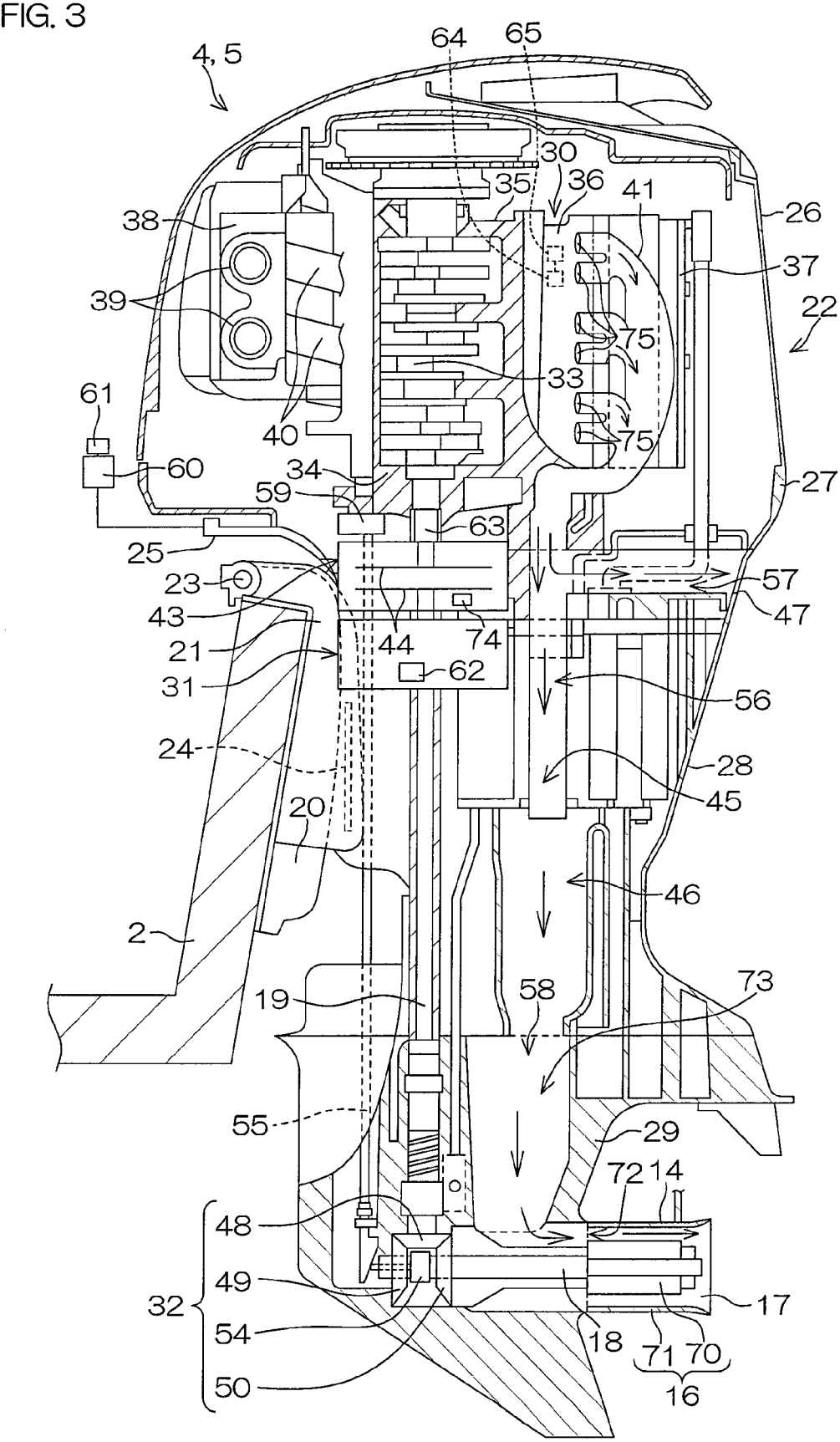
FIG. 3 is a schematic sectional view of a common configuration of a respective outboard motor.

FIG. 3 is a schematic sectional view showing a configuration common to the respective outboard motors 4 and 5. In FIG. 3, the left side of the paper indicates the forward side, and the right side of the paper indicates the reverse side.

The outboard motors 4 and 5 are each provided with a clamp bracket 20 and a swivel bracket 21 which define an attaching mechanism, and a propulsion unit 22 that defines a propulsion system. The clamp bracket 20 is detachably fixed to the stern plate of the hull 2. The swivel bracket 21 is rotatably coupled to the clamp bracket 20 centered around a tilt shaft 23 that is a horizontal turning axis.

The propulsion unit 22 is attached to the swivel bracket 21 rotatably around the steering axis 24, and is provided with a steering rod 25 at the forward side. A steering actuator 60 that includes a liquid hydraulic cylinder and is controlled by the corresponding outboard motor ECUs 8 or 9 is coupled to the steering rod 25. The propulsion unit 22 can be rotated around the steering axis 24 by driving the steering actuator 60, whereby steering operations are enabled. A steering angle sensor 61 that detects a steering angle is connected to the steering actuator 60.

Also, the propulsion unit 22 is arranged to rotate (tilt up and tilt down) around the tilt shaft 23.

The propulsion unit 22 includes an upper cowling 26 and a lower cowling 27 at the upper portion thereof, and includes an upper casing 28 and a lower casing 29 at the lower portion thereof. An engine 30 is disposed in the interior of the upper cowling 26 and the lower cowling 27. An electric motor 31, an exhaust system for the engine 30 and a power transmission system for the propeller 14 are disposed in the interior of the upper casing 28 and the lower casing 29.

A propeller shaft 18 extending in the forward and reverse direction is axially supported at the lower end portion of the lower casing 29. The rear end portion of the propeller shaft 18 is exposed outside through the lower casing 29, and a boss part 16 of the propeller 14 is attached to the rear end portion so as not to be relatively rotatable. The boss part 16 is formed such that a minor-diameter portion 70 and a major-diameter portion 71 are integrally provided. The minor-diameter section 70 is a long cylinder in the forward and reverse direction, into which the propeller shaft 18 is inserted. The major-diameter portion 71 accommodates the minor-diameter section 70 and is a hollow cylinder whose diameter is greater than that of the minor-diameter section 70. Clearance 72 is provided between the outer-circumferential surface of the minor-diameter section 70 and the inner-circumferential surface of the major-diameter portion 71. An in-water exhaust port 17 communicating with the clearance 72 is provided at the rear end of the major-diameter portion 71.

The engine 30 is, for example, a V-type 6-cylinder 4-cycle engine, and is arranged so that the axial line of the crankshaft 33 is in the vertical direction. In the engine 30, a cylinder block 35 is attached to a crankcase 34 in which the crankshaft 33 is accommodated. Two cylinder heads 36 are mounted on the cylinder block 35 to define a V-shaped cylinder.

In each cylinder head 36, a head cover 37 is mounted at the position farthest from the crankshaft 33. A camshaft (not illustrated) that is integral with the cam is axially supported at a portion to which the head cover 37 is attached in the cylinder head 36. Although not illustrated, a rotation force of the crankshaft 33 is transmitted to the camshaft of the cylinder head 36 by a timing belt. Therefore, the cam shaft turns, and in line therewith, an intake valve and an exhaust valve are opened and closed by the cam.

Pistons (not illustrated) are provided in respective cylinders in the respective cylinder blocks 35 so as to be reciprocal. Although not illustrated, respective pistons are coupled to the crankshafts 33 via connecting rods. Therefore, the respective pistons (not illustrated) reciprocate to allow the crankshafts 33 to rotate around the axial lines. The engine 30 is provided with an engine rotation detection section 63 that detects the rotational speed of the crankshaft 33 as the rotational speed of the engine 30.

Next, a description is provided of the power transmission system of the propeller 14, and the electric motor 31.

A drive shaft 19 passing through the upper casing 28 and the lower casing 29 in the vertical direction and extending to the vicinity of the front end portion of the propeller shaft 18 is coupled to the lower end of the crankshaft 33. By driving the engine 30, the drive shaft 19 can be rotated around the axial line. A multiple-plate clutch 43 and an electric motor 31 intervene in the middle of the drive shaft 19 in this order from above.

The multiple-plate clutch 43 includes a pair of clutch plates 44 opposed to each other in the vertical direction. By pressing one clutch plate 44 onto the other clutch plate 44, the portion above the multiple-plate clutch 43 can be linked with the portion below the multiple-plate clutch 43 in the drive shaft 19. Hereinafter, this action is described as "the multiple-plate clutch 43 is linked." By separating the other clutch plate 44 from one clutch plate 44, linkage between the portion above the multiple-plate clutch 43 and the portion below the multiple-plate clutch 43 can be released in the drive shaft 19. Hereinafter, this action is described as "the multiple plate clutch 43 is disconnected." Also, in association with the multiple-plate clutch 43, a clutch actuator 74 is provided to disconnect and link the multiple-plate clutch 43. Operation of the clutch actuator 74 is controlled by the corresponding outboard motor ECUs 8 or 9.

The electric motor 31 is installed so that the rotation axis thereof is coaxial with the drive shaft 19. The electric motor 31 is driven by supplying power thereto from the above-described battery 10 and can rotate the drive shaft 19. When driving the propeller 14 only by the electric motor 31, the multiple-plate clutch 43 is disconnected so that a drive force of the electric motor 31 is not transmitted to the crankshaft 33 of the engine 30. On the other hand, when the electric motor 31 is stopped and the drive shaft 19 is rotated by drive of the engine 30, the multiple-plate clutch 43 is linked. In this state, the rotation shaft of the electric motor 31 is driven and rotated by the drive shaft 19, whereby the electric motor 31 generates power and charges the battery 10. That is, the electric motor 31 also functions as a generator. Additionally, the electric motor 31 is provided with a motor rotation detection section 62 that detects the rotational speed of the rotation shaft as the rotational speed of the electric motor 31.

A shift mechanism 32 is disposed between the lower end section of the drive shaft 19 and the front end section of the propeller shaft 18. A rotation force of the drive shaft 19 is transmitted to the propeller shaft 18 via the shift mechanism 32.

The shift mechanism 32 includes a drive gear 48, a forward gear 49, a rearward gear 50, and a dog clutch 54. The drive gear 48, forward gear 49 and rearward gear 50 are all preferably defined by bevel gears. The drive gear 48 is fixed at the lower end of the drive shaft 19. The forward gear 49 and the rearward gear 50 are rotatably disposed on the propeller shaft 18. The dog clutch 54 is disposed between the forward gear 49 and the rearward gear 50. The forward gear 49 is engaged with the drive gear 48 from the forward side, and the rearward gear 50 is engaged with the drive gear 48 from the reverse side. Therefore, as the drive gear 48 rotates along with the drive shaft 19, the forward gear 49 and the rearward gear 50 are allowed to rotate in the directions opposite to each other. On the other hand, the dog clutch 54 is connected to the propeller shaft 18 by a spline. That is, although the dog clutch 54 is slidable in the axial direction of the propeller shaft 18, it cannot rotate relative to the propeller shaft 18, but it rotates along with the propeller shaft 18.

The dog clutch 54 is allowed to slide on the propeller shaft 18 by rotation around the axis of a shift rod 55 extending in the vertical direction parallel to the drive shaft 19, whereby the dog clutch 54 is controlled to any shift position of a forward position in which it is coupled with the forward gear 49, a rearward position in which it is coupled with the rearward gear 50, and a neutral position in which it is not coupled with either of the forward gear 49 or the rearward gear 50. When the dog clutch 54 is located at the forward position, rotation of the forward gear 49 is transmitted to the propeller shaft 18 via the dog clutch 54 substantially without slippage, whereby the propeller 14 is rotates in one direction (forward direction), and a propulsive force is generated in the direction along which the hull 2 runs forward. On the other hand, when the dog clutch 54 is located at the rearward position, rotation of the rearward gear 50 is transmitted to the propeller shaft 18 via the dog clutch 54 substantially without slippage, wherein the propeller 14 is rotated in the opposite direction (reverse direction), and a propulsive force is generated in the direction along which the hull 2 runs in reverse. When the dog clutch 54 is located at the neutral position, rotation of the drive shaft 19 is not transmitted to the propeller shaft 18, wherein no propulsive force is generated in any direction.

In association with the shift rod 55, a shift actuator 59 is provided to change the shift position of the dog clutch 54. The shift actuator 59 includes, for example, an electric motor, the operations of which are controlled by the corresponding outboard motor ECUs 8 or 9.

Next, a description is provided of the intake and exhaust systems of the engine 30.

In the upper cowling 26, an intake silencer 38 is disposed forward of the engine 30. Through-holes 39 communicating with the outside are provided in the intake silencer 38. One end of an intake duct 40 is connected to the intake silencer 38. An intake manifold (not illustrated) is connected to the other end of the intake duct 40. Although not illustrated, the intake manifold is connected to an intake port (not illustrated) of the cylinder of the engine 30. Injectors corresponding to the respective cylinders are connected to the intake manifolds. Atmospheric air taken in through the through-holes 39 of the intake silencer 38 via the intake duct 40 and fuel injected from the injector are blended to form an intake gas. The intake gas is supplied to the intake port of the cylinder via the intake manifold.

The intake manifold includes an electric throttle valve 64 and a throttle actuator 65 to vary the opening degree of the electric throttle valve 64. Actuation of the throttle actuator 65 is controlled by the corresponding outboard motor ECUs 8 or 9. Since the opening degree of the electric throttle valve 64 is varied by the control, the flow rate of the intake gas is regulated. In detail, as the opening degree of the electric throttle valve 64 is increased, the flow rate of the intake gas is accordingly increased, and as the opening degree of the electric throttle valve 64 is decreased, the flow rate of the intake gas is decreased. The rotational speed of the engine 30 is increased in accordance with an increase in the flow rate of the intake gas, and is decreased in accordance with a decrease in the flow rate of the intake gas.

An exhaust manifold 41 is connected to an exhaust port 75 of the respective cylinders. The exhaust manifold 41 is connected to an exhaust duct 45. The exhaust duct 45 is disposed at the lower portion of the cylinder head 36, and is configured to extend downward halfway in the vertical direction of the upper casing 28. A main exhaust duct 56 through which exhaust gas from the exhaust port 75 passes is defined by the exhaust manifold 41 and the exhaust duct 45.

An in-air exhaust port 47 is provided on the rear side of the upper casing 28. An in-air exhaust duct 57 that allows the exhaust duct 45 to communicate with the in-air exhaust port 47 is provided in the interior of the upper casing 28. An exhaust expansion chamber 45 the inner space of which is wider than the exhaust duct 46 is provided below the exhaust duct 45 in the upper casing 28. The exhaust expansion chamber 46 communicates with the exhaust duct 45.

An exhaust relay duct 73 that allows the exhaust expansion chamber 46 to communicate with the clearance 72 of the propeller 14 is provided in the interior of the lower casing 29. An in-water exhaust duct 58 preferably includes the exhaust expansion chamber 46, the exhaust relay duct 73 and the clearance 72.

The in-water exhaust duct 58 communicates with the in-water exhaust port 17 via the clearance 72 of the boss portion 16. The in-water exhaust port 17 preferably has an open reverse configuration. Therefore, in-water exhaust of the engine 30 is discharged reverse of a marine vessel.

Figure 4:
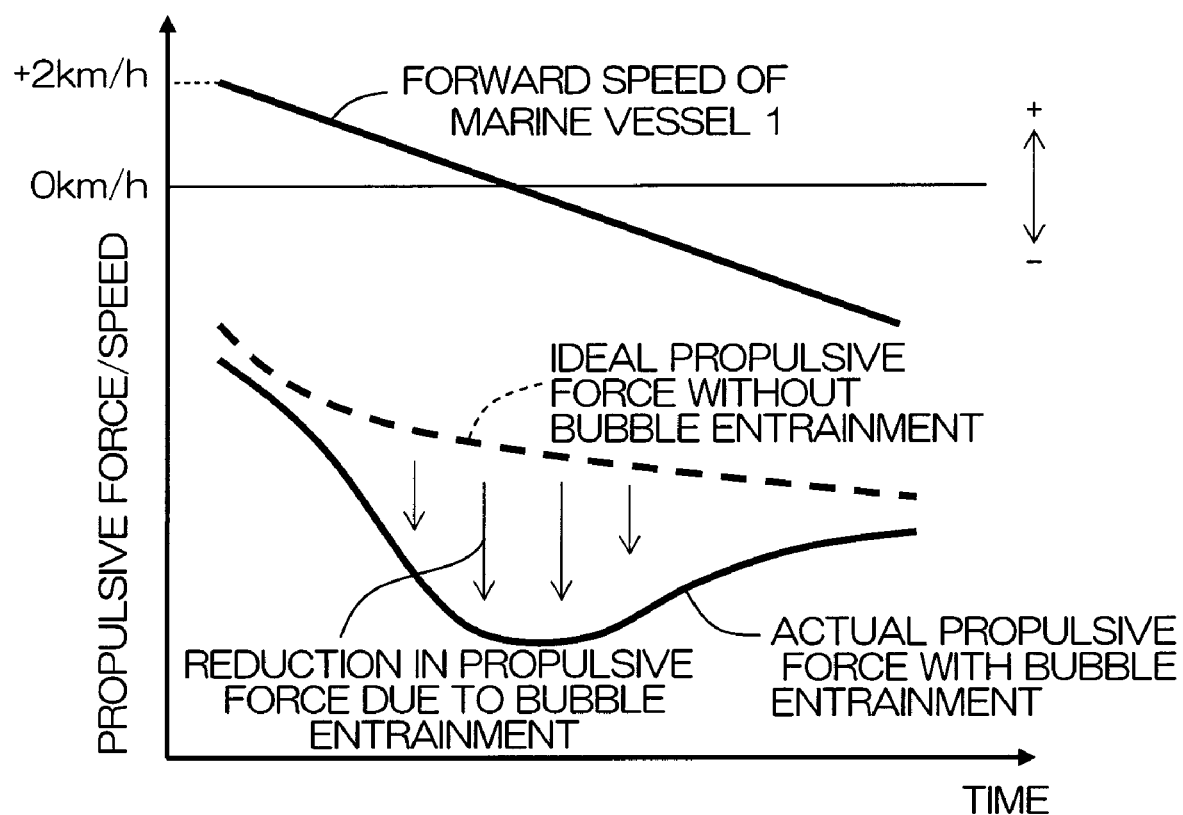
FIG. 4 is a diagram showing respective chronological changes of the forward speed of a marine vessel, an ideal propulsive force obtained when no bubble entrainment occurs, and an actual propulsive force.

FIG. 4 is a view showing respective chronological changes of a forward running speed of the marine vessel 1, the ideal propulsive force (shown by a broken line) where it is assumed that no bubble entrainment occurs, and a propulsive force in an actual state where bubble entrainment occurs (shown by a solid line). The states shown in FIG. 4 are as follows. That is, when the marine vessel 1 is in a forward running state, an operator operates the lever 11 in the reverse direction, whereby the rotation direction of the propeller 14 is reversed from the forward direction to the reverse direction. The opening degree of the electric throttle valve 64 is fixed, whereby the marine vessel 1 is in a decelerated state.

The ideal propulsive force in which it is assumed that no bubble entrainment occurs is gradually reduced. Where the rotation direction of the propeller 14 is the reverse direction while advancing (the speed is positive), the faster the forward running speed of the marine vessel 1 is, the more the load applied onto the propeller 14 becomes. In other words, the faster the forward running speed is, the greater the propulsive force generated by the propeller 14 becomes. This is expressed in a gradual lowering in the ideal propulsive force.

Where the propeller 14 rotates in the forward direction and the marine vessel 1 moves forward, exhaust gas of the engine 30 usually passes through the main exhaust duct 56 and the in-water exhaust duct 58, and is discharged in water through the in-water exhaust port 17. When the forward running speed of the marine vessel 1 exceeds, for example, +2 km/h, the surroundings around the in-water exhaust port 17 are in a negative pressure state due to water being discharged by the propeller 14, whereby in-water exhaust from the propeller 14 is enabled. However, since the marine vessel 1 runs forward, bubbles of exhaust gas discharged in water are moved away from the propeller 14, whereby no bubble entrainment occurs.

On the other hand, as the propeller 14 rotates in the reverse direction, and the forward running speed of the marine vessel 1 becomes about +2 km/h or less, bubbles are likely to stay in the vicinity of the propeller 14, whereby bubble entrainment occurs. As a result, the actual propulsive force is reduced as comparison to the ideal propulsive force in a state in which the opening degree of the electric throttle valve 64 is fixed. To correct the reduced propulsive force, it is necessary to increase the opening degree of the electric throttle valve 64.

In accordance with deceleration of the forward running speed of the marine vessel 1 from about +2 km/h to 0 km/h, the degree of bubble entrainment is increased. When the forward running speed of the marine vessel 1 becomes less than 0 km/h, that is, the marine vessel 1 moves in reverse, the degree of bubble entrainment is continuously high when the reverse running speed is near 0 km/h. As the reverse running speed of the marine vessel 1 is increased, the water pressure near the in-water exhaust port 17 is greater than the exhaust pressure of the engine 30, whereby the proportion of the in-water exhaust is reduced (the proportion of the in-air exhaust is increased), and it becomes difficult for bubble entrainment to occur. In this case, the majority of exhaust gas of the engine 30 passes through the main exhaust duct 56 and the in-air exhaust duct 57, and is discharged into air through the in-air exhaust port 47. Thus, when the rotation direction of the propeller 14 is the reverse direction, and the running speed of the marine vessel 1 is near 0 km/h, it has been determined that bubble entrainment and reduced propulsive force due to bubble entrainment are the worst.

When the rotation direction of the propeller 14 is the forward direction, in-water exhaust of the engine 30 is moved away from the corresponding propeller 14 due to rotation of the propeller 14. On the other hand, when the rotation direction of the propeller 14 is the reverse direction, in-water exhaust of the engine 30 is dragged to the corresponding propeller 14 due to rotation of the propeller 14.

Figure 5:
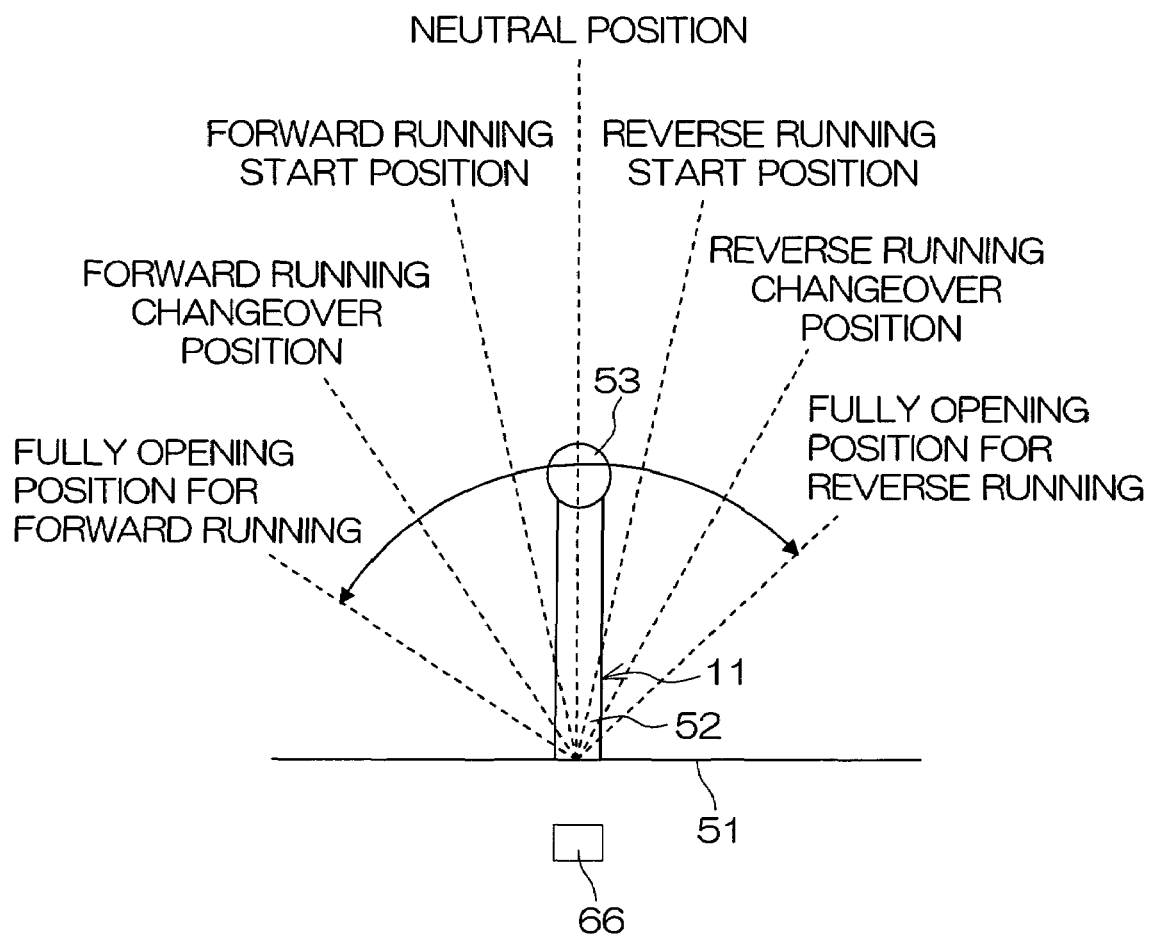
FIG. 5 is a schematic side view of a lever.

FIG. 5 is a schematic side view of the lever 11. In FIG. 5, the left side of the paper is the forward side, and the right side of the paper is the reverse side.

The lever 11 includes a rod 52 and a substantially spherical knob 53 provided at a free end portion of the rod 52. The rod 52 protrudes from an operation panel 51 provided in the hull 2 and is tiltable in any direction.

The neutral position of the lever 11 is a position in which the rod 52 is substantially perpendicular with respect to the surface of the operation panel 51. As an operator holds the knob 53 and tilts the lever 11 from the neutral position to a desired direction, the marine vessel running apparatus 13 controls the rotation directions and rotational speeds of the propellers 14 in the respective outboard motors 4 and 5 and the steering angle based on the tilting position (the tilting direction and tilting amount) of the lever 11. Therefore, the running speed and the running direction of the marine vessel 1 can be changed depending on the tilting direction of the lever 11.

FIG. 5 shows the tilting amounts where the lever 11 is tilted in the forward and reverse direction. And, herein after, a description is provided of cases in which the marine vessel 1 is run in the forward and reverse directions.

The tilting position of the lever 11 in the forward and reverse direction is detected by a position sensor 66 provided in the operation panel 51, and is provided to the marine vessel running controlling apparatus 13.

Hereinafter, a tilting position of the lever 11 with the lever 11 tilted forward by a predetermined amount from the neutral position is called a "forward running start position," and a tilting position of the lever 11 with the lever 11 further tilted forward from the forward running start position by a predetermined tilting amount is called a "forward running changeover position." And, a tilting position of the lever 11 with the lever 11 fully tilted further forward from the forward running changeover position is called a "fully opening position for forward running." On the other hand, a tilting position of the lever 11 with the lever 11 tilted reverse from the neutral position by a predetermined amount is called a "reverse running start position," and a tilting position of the lever 11 with the lever 11 further tilted reverse from the reverse running start position is called a "reverse running changeover position." And, a tilting position of the lever 11 with the lever 11 fully titled further reverse from the reverse running changeover position is called a "fully opening position for reverse running."

When the lever 11 is located between the forward running start position and the reverse running start position, the engine 30 is idling, and the electric motor 31 is not driven. At this time, the multiple-plate clutch 43 is disconnected, and the dog clutch 54 is controlled to the neutral position. Therefore, since no drive force of the engine 30 is transmitted to the propeller 14, no propulsive force is generated.

Further, when the lever 11 is located between the forward running start position and the forward running changeover position, the engine 30 is idling, and the multiple-plate clutch 43 is disconnected, and the dog clutch 54 is controlled to the forward running position. Therefore, only the drive force of the electric motor 31 is transmitted to the propeller 14, whereby the propeller 14 is rotated in the forward direction. When the lever 11 is located between the forward running changeover position and the fully opening position for forward running, the multiple-plate clutch 43 is connected, and the dog clutch 54 is controlled to the forward running position. Accordingly, the drive force of the engine 30 is transmitted, whereby the propeller 14 is rotated in the forward direction.

On the other hand, when the lever 11 is located between the reverse running start position and the reverse running changeover position, the engine 30 is idling, the multiple-plate clutch 43 is disconnected, and the dog clutch 54 is controlled to the reverse running position. And, since only the drive force of the electric motor 31 is transmitted, the propeller 14 is rotated in the reverse running position. When the lever 11 is located between the reverse running changeover position and the fully opening position for reverse running, the multiple-plate clutch 43 is connected, and the dog clutch 54 is controlled to the reverse running position. Accordingly, the drive force of the engine 30 is transmitted, whereby the propeller 14 is rotated in the reverse direction.

When the drive force of the engine 30 is transmitted to the propeller 14, the electric motor 31 may be driven to compensate for a shortage in the drive force of the engine 30. However, as described above, in the present preferred embodiment, when the propeller 14 is driven by the engine 30, the electric motor 31 functions as a generator which is rotated by the engine 30 to charge the batteries 10. In addition, where the lever 11 is located between the reverse running start position and the reverse running changeover position, the engine 30 may not enter into an idling state but may stop, and the engine 30 may be started at the moment when a drive force of the engine 30 is required.

Thus, if the lever 11 is tilted forward or reverse from the neutral position, the marine vessel 1 first moves forward or reverse only by a drive force of the electric motor 31. If the lever 11 is further tilted, the running speed of the marine vessel 1 is increased, and the source of generating a drive force is changed from the electric motor 31 to the engine 30.

If the lever 11 is tilted reverse in a state in which the marine vessel 1 is running forward, a braking movement can be performed by which the running speed thereof is decelerated. A braking movement can be also performed if the lever 11 is tilted forward when the marine vessel moves reverse.

Further, when the engine 30 is idling, exhaust of the engine 30 is primarily discharged in air, and in-water exhaust does not substantially occur or is only minor if it occurs.

Figure 6:
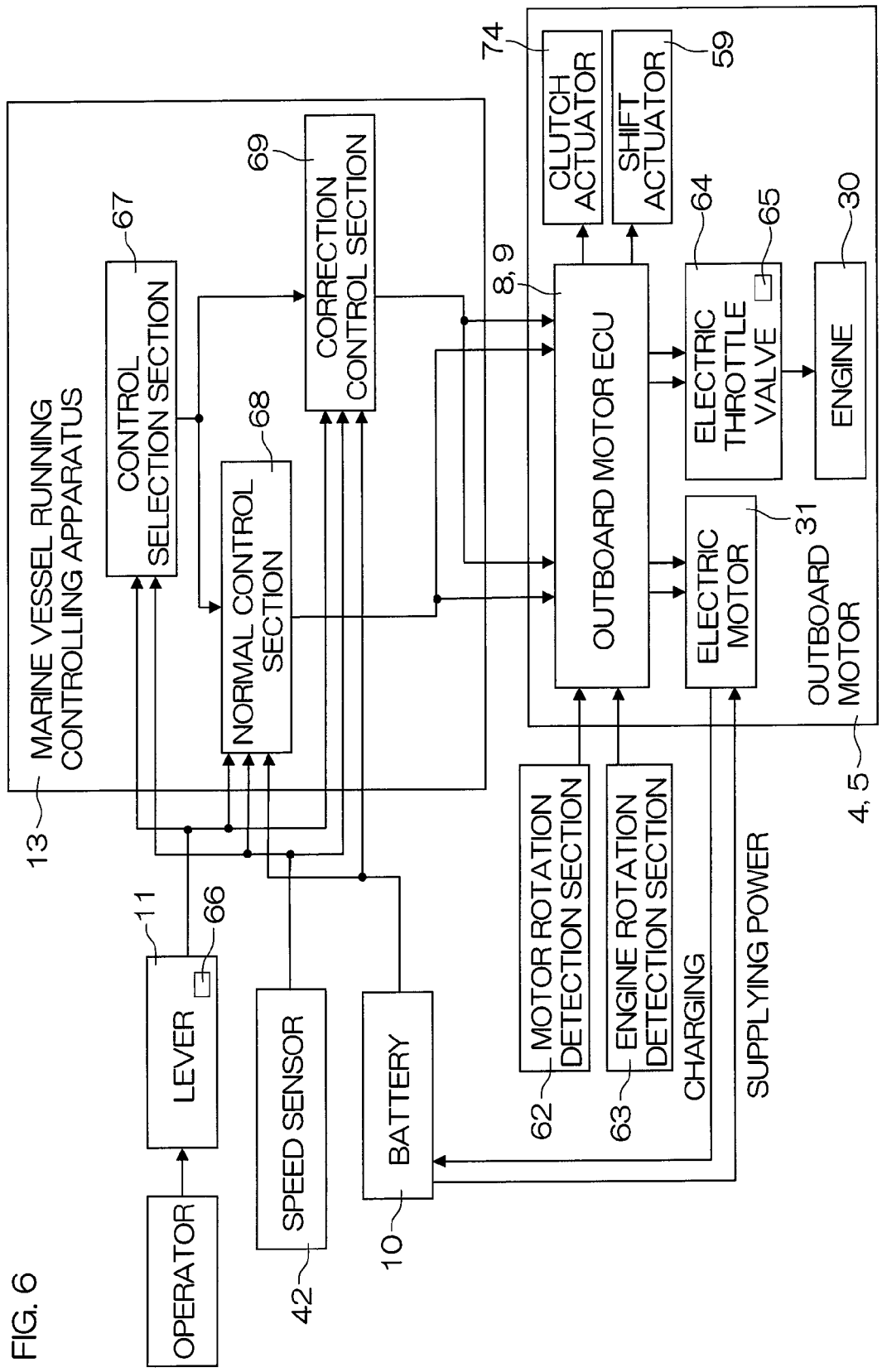
FIG. 6 is a block diagram showing a control system of the respective outboard motors.

FIG. 6 is a block diagram showing a control system to control respective outboard motors 4 and 5 based on operations of the lever 11.

The marine vessel running controlling apparatus 13 preferably includes a control selection section 67, a normal control section 68, and a correction control section 69. The control selection section 67 functions as a judgment unit, a bubble entrainment judgment unit, a control unit, a rotation direction judgment unit and a speed judgment unit, and the correction control section 69 functions as a characteristics setting unit, a correction coefficient setting unit, an electric motor rotational speed setting unit and an engine rotational speed setting unit.

As an operator operates the lever 11, data of the tilting position of the lever 11 which is detected by the position sensor 66 is provided to the control selection section 67, the normal control section 68 and the correction control section 69. Data of the running speed of the marine vessel 1 which is detected by the speed sensor 42 is provided to the control selection section 67, the normal control section 68 and the correction control section 69. Also, data regarding charge amounts of the batteries 10 is provided to the normal control section 68 and the correction control section 69, and the normal control section 68 and the correction control section 69 monitor the charge amounts of the battery 10. As described above, the battery 10 supplies power to the electric motor 31, and the electric motor 31 charges the battery 10.

The control selection section 67 performs selection control, by which the normal control section 68 or the correction control section 69 is selected, based on the tilting position of the lever 11 and the running speed of the marine vessel 1. The normal control section 68 performs normal control described later, and the correction control section 69 performs correction control described later. In the normal control and the correction control, target rotation directions and target rotational speeds of the propellers 14 in the respective outboard motors 4 and 5 are, respectively, set based on the tilting position of the lever 11 and the running speed of the marine vessel 1, and are provided to the respective outboard motor ECUs 8 and 9. In detail, the target rotational speed of the propeller 14 is converted to a target rotational speed of the electric motor 31 and a target rotational speed of the engine 30, which are provided to the respective outboard motor ECUs 8 and 9. Thus, the lever 11 functions as a direction instruction unit that generates an instruction of the rotation direction of the propeller 14 and as a speed instruction unit that generates an instruction value of the rotational speed thereof.

When a target rotational speed is provided to the electric motor 31, each of the outboard motors ECUs 8 and 9 determines the shift position (forward, reverse and neutral) of the dog clutch 54 based on the target rotation direction of the propeller 14. And, each of the ECUs 8 and 9 controls operation of the clutch actuator 74 so that the multiple-plate clutch 43 is disconnected, and when the multiple-plate clutch 43 is disconnected, each of the ECUs 8 and 9 controls operation of the shift actuator 59 so that the dog clutch 54 changes to a predetermined shift position. And, each of the outboard motors ECUs 8 and 9 controls the electric motor 31 so that it is set to the target rotational speed. In detail, in regard to the rotational speed control of the electric motor 31, feedback control is performed based on an actual rotational speed detected by the motor rotation detection section 62.

On the other hand, as a target rotational speed of the engine 30 is provided, each of the outboard motors ECUs 8 and 9 determines the shift position of the dog clutch 54 based on the target rotation direction of the propeller 14. And, each of the outboard motor ECUs 8 and 9 controls operation of the clutch actuator 74 so that the multiple-plate clutch 43 is connected, and when the multiple-plate clutch 43 is connected, each of the ECUs 8 and 9 controls operation of the shift actuator 59 so that the dog clutch 54 changes to a predetermined shift position. And, each of the outboard motor ECUs 8 and 9 controls the throttle actuator 65 so that the opening degree of the electric throttle valve 64 is turned into an opening degree corresponding to the target rotational speed of the engine 30. In detail, with respect to the rotational speed control of the engine 30, feedback control is performed based on an actual rotational speed detected by the engine rotation detection section 63.

Figure 7:
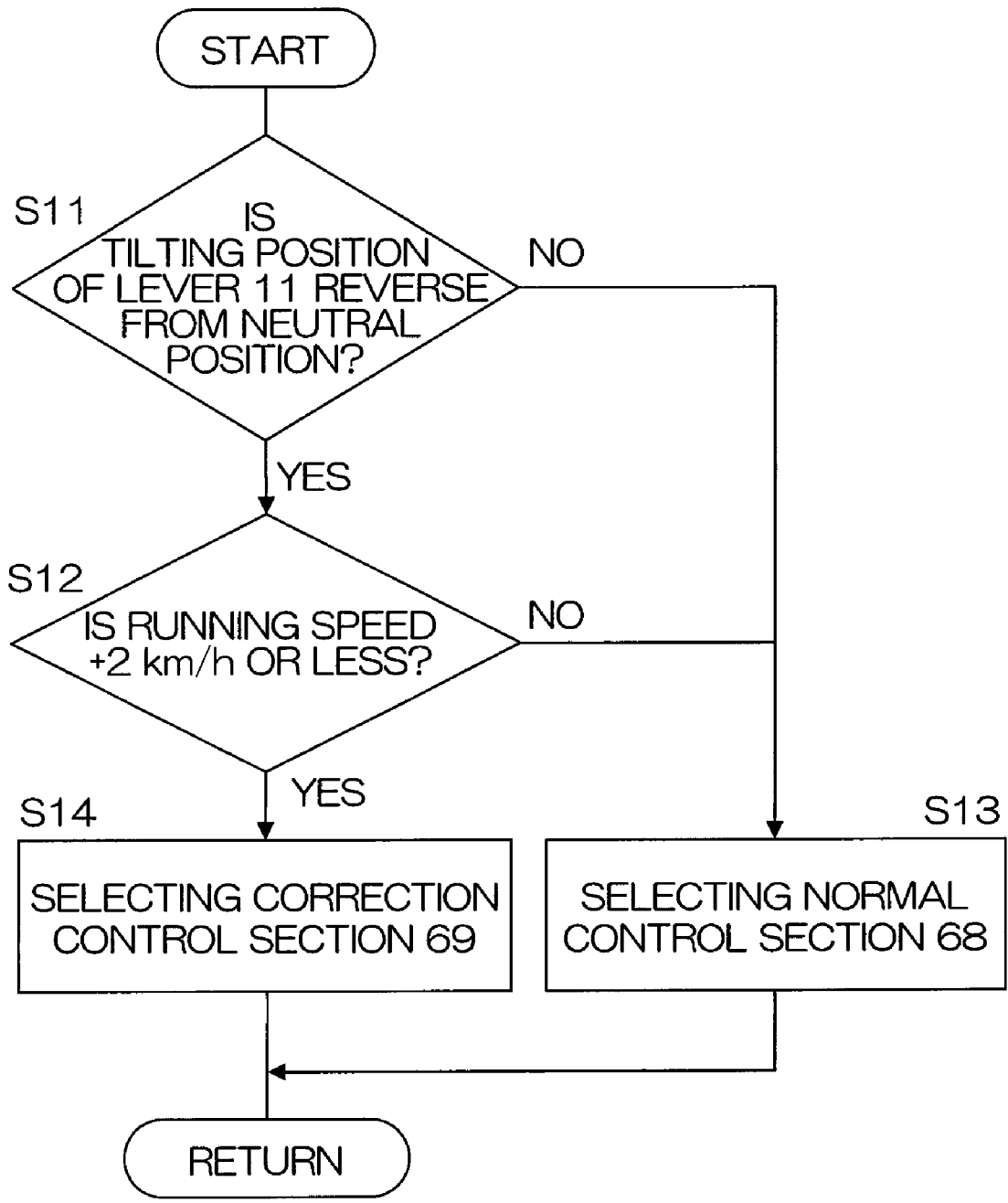
FIG. 7 is a flowchart showing selection control repeatedly carried out every predetermined control cycle by a control selection section.

FIG. 7 is a flowchart describing the selection control that is repeatedly performed by the control selection section 67 every predetermined cycle.

The control selection section 67 determines, when the lever 11 is tilted reverse (the tilting position of the lever 11 is moved reverse from the neutral position) (YES in Step S11), that the target rotation direction of the propeller 14 is the reverse direction. And, the control selection section 67 determines, with reference to the output of the speed sensor 42, whether the running speed of the marine vessel 1 is +2 km/h or less (Step S12). As described above, when the tilting position of the lever 11 is reverse, that is, the rotation direction of the propeller 14 is the reverse direction, and the running speed of the marine vessel 1 becomes about +2 km/h or less, bubble entrainment is likely to occur. Therefore, in Step S12, if the running speed of the marine vessel 1 is about +2 km/h or less (YES in Step S12), the control selection portion 67 selects the correction control section 69 (Step S14). If the running speed of the marine vessel 1 exceeds about 2 km/h (NO in Step S12), the control selection section 67 selects the normal control section 68 (Step S13).

On the other hand, when the lever 11 is tilted forward (the tilting position of the lever 11 is moved forward from the neutral position) (NO in Step S11), the control selection section 67 determines that the target rotation direction of the propeller 14 is the forward direction, and selects the normal control section 68 (Step S13).

Thus, since the control selection section 67 determines not only the rotation direction of the propeller 14 but also whether the running speed of the marine vessel 1 is a predetermined forward speed or less, it is possible to accurately judge whether the propeller 14 is in a running state in which bubble entrainment is likely to occur. And, based on the determination, either one of control by the normal control section 68 or control by the correction control section 69 can be selected.

Figure 8:
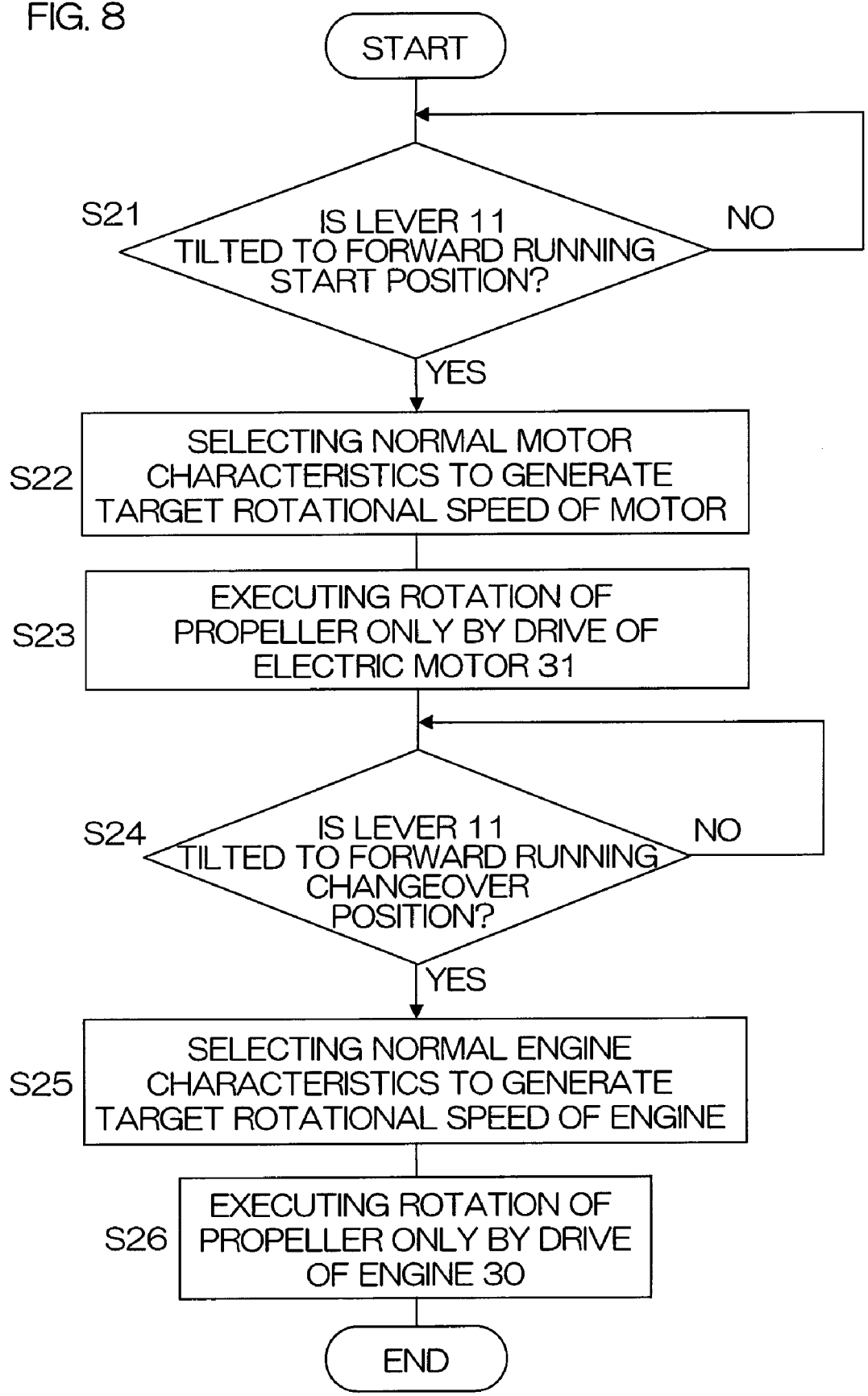
FIG. 8 is a flowchart showing normal control by a normal control section.
Figure 9:
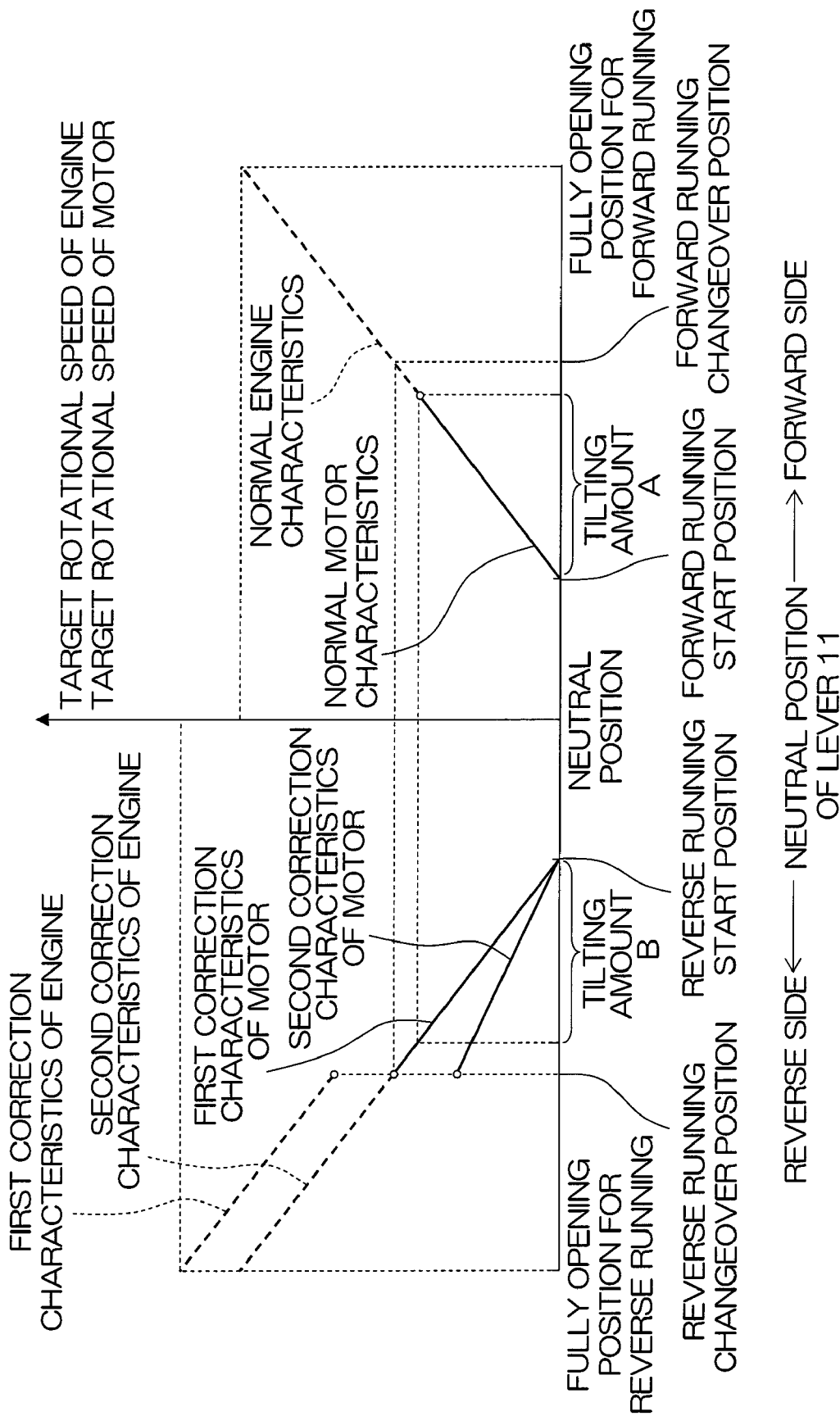
FIG. 9 is a graph showing the relationship between a tilting position of the lever, and a target rotational speed of an engine and a target rotational speed of an electric motor.

FIG. 8 is a flowchart describing the normal control by the normal control section 68. FIG. 9 is a graph showing the relationship between the tilting position of the lever 11, and the target rotational speed of the engine and the target rotational speed of the motor.

The normal control section 68 selects normal motor characteristics (refer to FIG. 9) set in advance (Step S22) when the lever 11 is tilted forward and is tilted to the forward running position (YES in Step S21). Also, in Step S22, the normal control section 68 generates a target rotational speed Vm of the motor corresponding to the tilting position of the lever 11 based on the normal motor characteristics. And, the normal control section 68 performs rotation of the propeller 14 only by drive of the electric motor 31 (Step S23).

In detail, the normal control section 68 allows each of the outboard motor ECUs 8 and 9 to perform drive control of the electric motor 31 based on the target rotational speed Vm of the motor.

When the lever 11 is not tilted to the forward running position, that is, when the tilting position of the lever 11 is located between the neutral position and the forward running position (NO in Step S21), the normal control section 68 monitors the tilting position of the lever 11 without generating the target rotational speed Vm of the motor.

If the lever 11 is tilted to the forward running changeover position (YES in Step S24) in a state in which the propeller is rotating (Step S23), the normal control section 68 selects the normal engine characteristics (refer to FIG. 9) set in advance (Step S25). Also, in Step S25, the normal control section 68 generates a target rotational speed Ve of the engine corresponding to the tilting position of the lever 11 based on the normal engine characteristics. And, the normal control section 68 performs rotation of the propeller 14 by drive of the engine 30 (Step S26). In detail, the normal control section 68 allows each of the outboard motor ECUs 8 and 9 to perform drive control of the engine 30 based on the target rotational speed Ve of the engine.

When the lever 11 is not tilted to the forward running changeover position, that is, the tilting position of the lever 11 is located between the forward running position and the forward running changeover position (NO in Step S24), the normal control section 68 continuously rotates the propeller only by drive of the electric motor 31.

In the example shown in FIG. 9, the normal motor characteristics are defined so that the target rotational speed Vm of the motor is allowed to linearly increase in accordance with an increase in the tilting amount of the lever 11. Also, the normal engine characteristics are defined so that the target rotational speed Ve of the engine is allowed to linearly increase in accordance with an increase in the tilting amount of the lever 11. And, at the forward running changeover position, the target rotational speed Vm of the motor and the target rotational speed Ve of the engine are determined to be equal to each other. Therefore, continuation of the propulsive force can be secured before and after changeover between a state in which the propeller 14 is driven only by the electric motor 31 and a state in which a drive force of the engine 30 is transmitted to the propeller 14.

Figure 10:
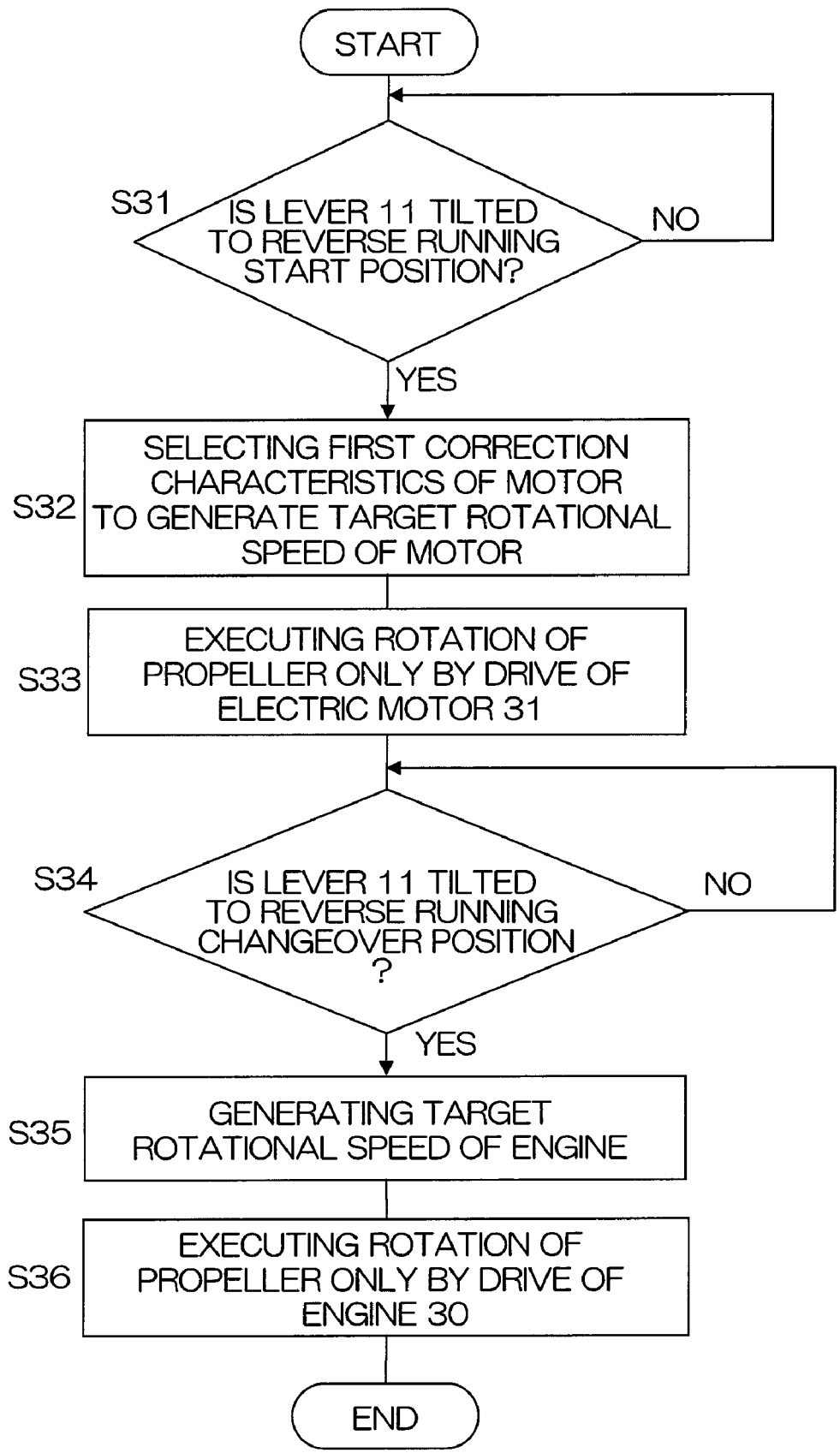
FIG. 10 is a flowchart showing correction control by a correction control section.

FIG. 10 is a flowchart describing the correction control by the correction control section 69.

When the lever 11 is tilted to the reverse running start position (YES in Step S31), the correction control section 69 selects first correction characteristics of the motor (refer to FIG. 9) set in advance (Step S32). Also, in Step S32, the correction control section 69 generates a target rotational speed Vm' of the motor corresponding to the tilting position of the lever 11 based on the first correction characteristics of the motor, and the correction control section 69 rotates the propeller 14 only by drive of the electric motor 31 (Step S33). In detail, the correction control section 69 allows each of the outboard motor ECUs 8 and 9 to execute drive control of the electric motor 31 based on the target rotational speed Vm' of the motor.

When the lever 11 is not tilted to the reverse running start position, that is, when the tilting position of the lever 11 is located between the neutral position and the reverse running start position (NO in Step S31), the correction control section 69 continues monitoring of the tilting position of the lever 11 without generating the target rotational speed Vm' of the motor.

In the example shown in FIG. 9, the first correction characteristics of the motor are set to be similar to the normal motor characteristics. That is, the target rotational speed Vm' of the motor are set to be linear with respect to the tilting amount of the lever 11 in the reverse direction. And, the relationship between the target rotational speeds Vm and Vm' of the motor with respect to the tilting amount is set to be equal between the normal motor characteristics and the first correction characteristics of the motor.

When the propeller 14 is rotated only by drive of the electric motor 31, since no exhaust gas is discharged in water, no bubble entrainment occurs regardless of the tilting position of the lever 11 and the running speed of the marine vessel 1. Therefore, when the first correction characteristics of the motor are set so that, when the lever 11 is tilted by the same tilting amount from the neutral position to each of the forward and reverse directions, the target rotational speed Vm of the motor in the normal control becomes equal to the target rotational speed Vm' of the motor in the correction control.

If the lever 11 is tilted to the reverse running changeover position (YES in Step S34) in which the propeller is rotated by the electric motor 31 (Step S33), the correction control section 69 generates the target rotational speed Ve' of the engine (Step S35). In detail, the correction control section 69 establishes a correction coefficient based on the running speed of the marine vessel 1 and the tilting amount of the lever 11. In addition, the correction control section 69 calculates the target rotational speed Ve of the engine (basic value) obtained by applying the tilting amount to the normal engine characteristics. Furthermore, the correction control section 69 generates the target rotational speed Ve' of the engine by multiplying the target rotational speed Ve (basic value) of the engine by the above-described correction coefficient. Since target rotational speeds Ve' of the engine are generated in accordance with various tilting amounts of the lever 11, respectively, the first correction characteristics of the engine (see FIG. 9) will be established accordingly. That is, as a result, the target rotational speed Ve' of the engine is generated in accordance with the first correction characteristics of the engine.

As the target rotational speed Ve' of the engine is thus generated, the correction control section 69 changes the propeller 14 to rotation by drive of the engine 30 (Step S36). In detail, the correction control section 69 allows each of the outboard motors ECUs 8 and 9 to perform drive control of the engine 30 based on the target rotational speed Ve' of the engine.

When the lever 11 is not tilted to the reverse running changeover position, that is, when the tilting position of the lever 11 is located between the reverse running start position and the reverse running changeover position (NO in Step S34), the correction section 69 does not generate the target rotational speed Ve' of the engine. That is, rotation of the propeller 14 based only on drive of the electric motor 31 is continued.

Figure 11:
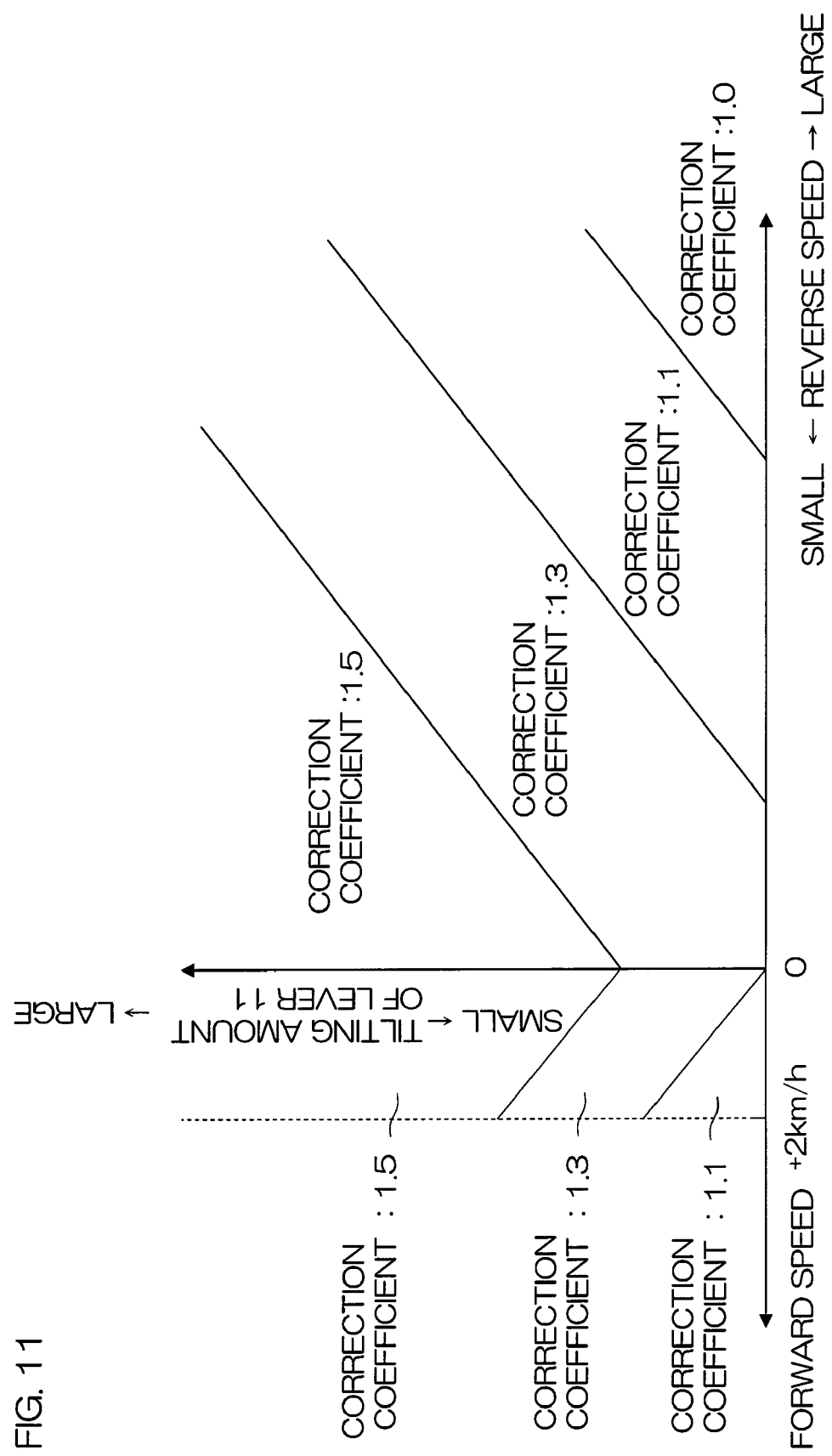
FIG. 11 is a view showing a map used to set a correction coefficient in the correction control.

FIG. 11 is a map used when the correction control section 69 sets the above-described correction coefficient. The map expresses the relationship between the correction coefficient, and the tilting amount of the lever 11 and the running speed of the marine vessel 1. As described above, the correction coefficient is a coefficient to obtain the target rotational speed Ve' of the engine according to the first correction characteristics of the engine by being multiplied to the target rotational speed Ve of the engine according to the normal engine characteristics.

When the propeller 14 is rotated in reverse by drive of the engine 30, bubble entrainment may occur depending on the running speed of the marine vessel 1. When bubble entrainment occurs, the propulsive force is reduced as comparison to the normal control even if the target rotational speed of the engine is set as in the normal engine characteristics. In order to correct the reduced propulsive force, the first correction characteristics of the engine (see FIG. 9) are set so as to set the target rotational speed Ve' of the engine by multiplying the target rotational speed Ve (basic value) of the engine in the normal engine characteristics by a correction coefficient that is about 1.0 or more. In further detail, the correction control section 69 calculates the target rotational speed Ve of the engine corresponding to the reverse tilting amount of the lever 11 by referencing the normal engine characteristics. Furthermore, the correction control section 69 calculates the target rotational speed Ve' of the engine in accordance with the first correction characteristics of the engine by multiplying the target rotational speed Ve of the engine by a correction coefficient that is about 1.0 or more. Therefore, the target rotational speed Ve' of the engine based on the first correction characteristics of the engine will be set to be equal to or greater than the target rotational speed Ve of the engine based on the normal engine characteristics (See FIG. 9).

As shown in FIG. 9, at the reverse running changeover position, the target rotational speed Vm' of the motor depending on the first correction characteristics of the motor is not continuous to the target rotational speed Ve' of the engine depending on the first correction characteristics of the engine, and the target rotational speed Ve' of the engine is higher. This is to compensate for the reduced propulsive force caused by bubble entrainment when the propeller 14 is rotated by the engine 30. Therefore, at the reverse running changeover position, the target rotational speeds of the propeller 14 are discontinuous. However, continuation of the propulsive force can be retained.

As described above, bubble entrainment does not substantially occur as the reverse speed of the marine vessel 1 is high. Also, as the tilting amount of the lever 11 is decreased, the rotational speed of the engine is reduced, and the amount of bubbles exhausted in water is reduced. Therefore, bubble entrainment does not substantially occur, and the reduction in the propulsive force is reduced. For this reason, the correction control section 69 variably sets the correction coefficient so that it approaches 1.0 in accordance with a decrease in the tilting amount of the lever 11 or an increase in the reverse speed of the marine vessel 1.

On the other hand, the above-described reduction in the propulsive force increases in accordance with a increase in the tilting amount of the lever 11 a decrease in the reverse speed of the marine vessel 1. Accordingly, the correction control section 69 variably sets the correction coefficient, for example, from 1.1 through 1.3 to 1.5 in accordance with an increase in the tilting amount of the lever 11. Further, when the running speed of the marine vessel 1 is between 0 km/h and about +2 km/h, the correction coefficient is variably set so as to increase in accordance with an increase in the tilting amount of the lever 11 or in accordance with a decrease in the forward speed of the marine vessel 1. Therefore, the target rotational speed Ve' of the engine based on the first correction characteristics of the engine is always set without to be greater than the target rotational speed Ve of the engine based on the normal engine characteristics. In addition, it is possible to appropriately establish the target rotational speed Ve' of the engine by changing the correction coefficient according to the conditions.

Figure 12:
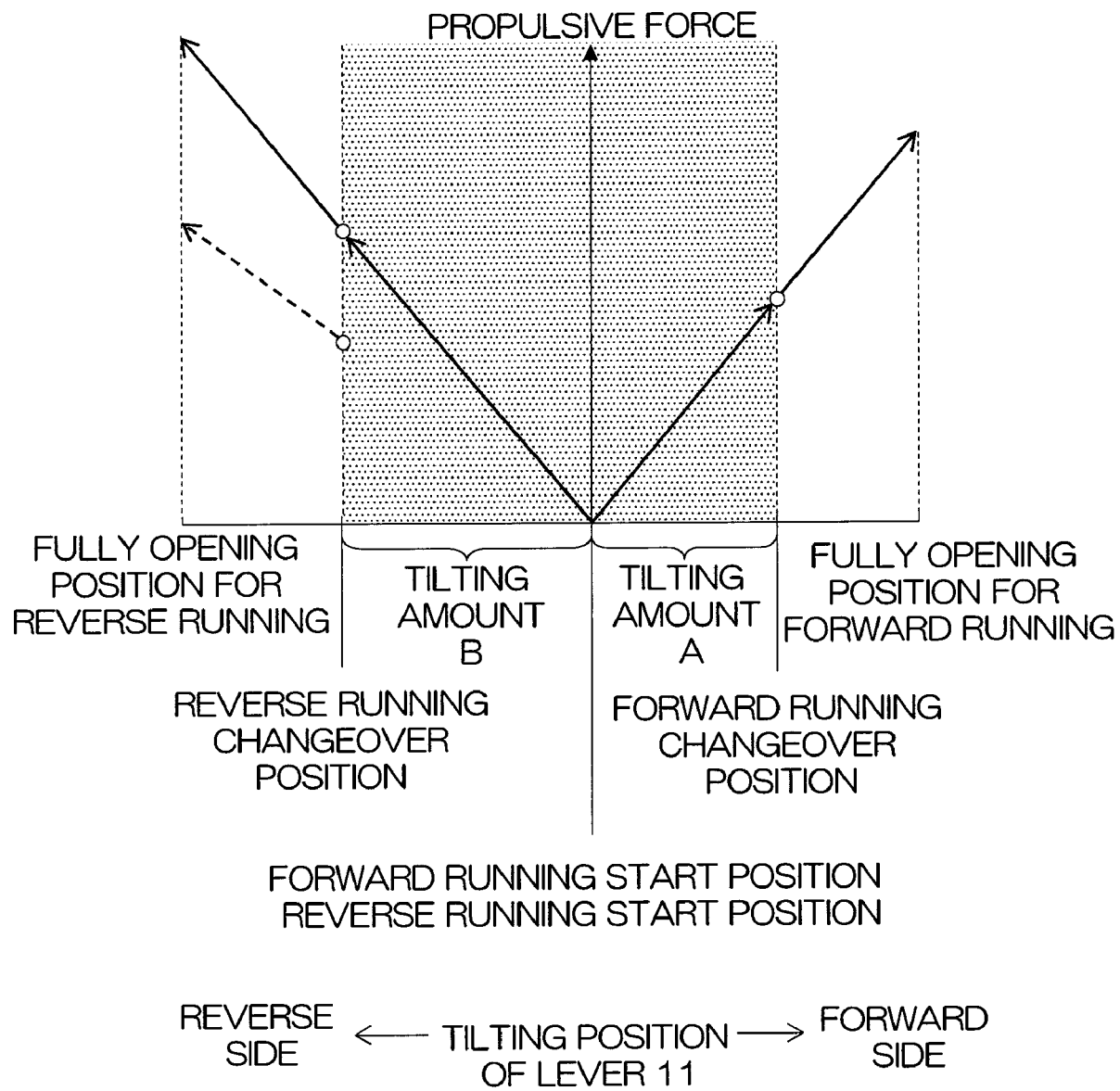
FIG. 12 is a graph showing one example of the relationship between the lever tilting position and the propulsive force when the lever tilting amount from a reverse running start position to a reverse running changeover position is set to be greater than the lever tilting amount from a forward running position to a forward running changeover position.

FIG. 12 is a graph showing one example of the relationship between the tilting position of the lever 11 and the propulsive force generated by the propeller 14. In this example, a tilting amount B of the lever 11 from the reverse running start position to the reverse running changeover position is set to be greater than a tilting amount A of the lever 11 from the forward running position to the forward running changeover position.

When the lever 11 is tilted forward, no bubble entrainment occurs. Therefore, when only drive by the electric motor 31 is changed over to drive by the engine 30 at the forward running changeover position, it is sufficient that the target rotational speed Vm of the motor is set to be equal to the target rotational speed Ve of the engine. Therefore, the propulsive force is continuous, wherein the propulsive force can be smoothly output depending on the tilting position of the lever 11.

Reduction in the propulsive force due to bubble entrainment occurs by the tilting position of the lever 11 reaching the reverse running changeover position and commencement of in-water exhaust of the engine 30. Herein, unless the target rotational speed Ve' of the engine is set by the correction control to be greater than the target rotational speed Ve of the engine in the normal control, the propulsive force is not continuous at the reverse running changeover position as shown with the broken line arrow in the drawing.

When the tilting position of the lever 11 is between the forward running changeover position and the reverse running changeover position, the speed area of the marine vessel 1 is called a "dead slow area." The actual maximum rotational speed of propeller is, for example, about 700 rpm through about 1000 rpm in the dead slow area. The dead slow area is a speed area in which forward or reverse running such as arriving at or leaving from a shore or trolling is performed at an extra-low speed. If discontinuance occurs in the propulsive force in this speed area, uncomfortable feelings experienced by passengers substantially increase.

Therefore, in the example shown in FIG. 12, the tilting amount B of the lever 11 from the reverse running start position to the reverse running changeover position is set in advance to be greater than the tilting amount A of the lever 11 from the forward running position to the forward running changeover position. Therefore, it is possible to suppress changeover from drive of the propeller 14 by the electric motor 31 to drive of the propeller 14 by the engine 30 at low speed running. As a result, it is possible to suppress the propulsive force from being reduced due to bubble entrainment. Accordingly, uncomfortable feelings at the dead slow area are substantially reduced. Also, in FIG. 9, corresponding to FIG. 12, the tilting amount B of the lever 11 to the reverse running changeover position is set to be greater than the tilting amount A to the forward running changeover position.

In addition, the frequency at which the marine vessel 1 is run in the forward direction is greater than the frequency at which the marine vessel 1 is run in the reverse direction. Therefore, if the tilting amount A to the forward running changeover position is set smaller, power consumption is reduced by suppressing drive of the electric motor 31. Accordingly, the batteries 10 are prevented from being undesirably consumed. On the other hand, if the tilting amount B to the reverse running changeover position is set greater, it is possible to effectively suppress uncomfortable feelings due to bubble entrainment. That is, it is possible to reduce uncomfortable feelings while reducing power consumption.

As described above, the control selection section 67 changes over the first mode, in which only the drive force of the electric motor 31 is transmitted to the propeller 14, and in the second mode, in which the drive force of the engine 30 is transmitted to the propeller 14, depending on the tilting position of the lever 11. As described above, the tilting position of the lever 11 indicates an instruction of the rotation direction of the propeller 14 and an instruction value of the rotational speed thereof. Further, the rotation direction and the rotational speed of the propeller 14 are extremely associated with generation of bubble entrainment. And, the timing when changing from the first mode and the second mode, that is, the timing when the lever 11 is located at the reverse running changeover position, is the timing at which the propulsive force is reduced due to bubble entrainment.

In the present preferred embodiment, control by the correction control section 69 is selected under a condition at which bubble entrainment occurs, and the target rotational speed Ve' of the engine is determined so that discontinuance of the propulsive force is suppressed at the point of time when the first mode and the second mode are changed over. In detail, the target rotational speed Ve' of the engine is determined by the correction control to be greater than the target rotational speed Ve of the engine at the normal control. As a result, since the output of the engine 30 is increased as compared to the normal control even if bubble entrainment occurs, the propulsive force is made continuous at the reverse running changeover position, and the propulsive force corresponding to the tilting position of the lever 11 can be smoothly output. Therefore, since the propulsive force is prevented from being reduced, uncomfortable feelings resulting from discontinuance of the propulsive force are reduced. Furthermore, there may be cases in which bubble entrainment occurs when the lever 11 is tilted forward in the marine vessel 1, that is in the reverse status, the correction control is also performed in these cases.

In addition, in the example shown in FIG. 12, the control selection section 67 applies different values (thresholds) such as A and B described above with respect to the tilting amount of the lever 11 until the first mode and the second mode are changed over. In detail, when the rotation direction of the propeller 14 is a reverse direction along which reduction in the propulsive force occurs due to bubble entrainment, the tilting amount B is set to be greater so that it becomes difficult for changeover from the first mode to the second mode to occur in a low-speed running area, whereby uncomfortable feelings experienced by passengers are further alleviated.

Figure 13:
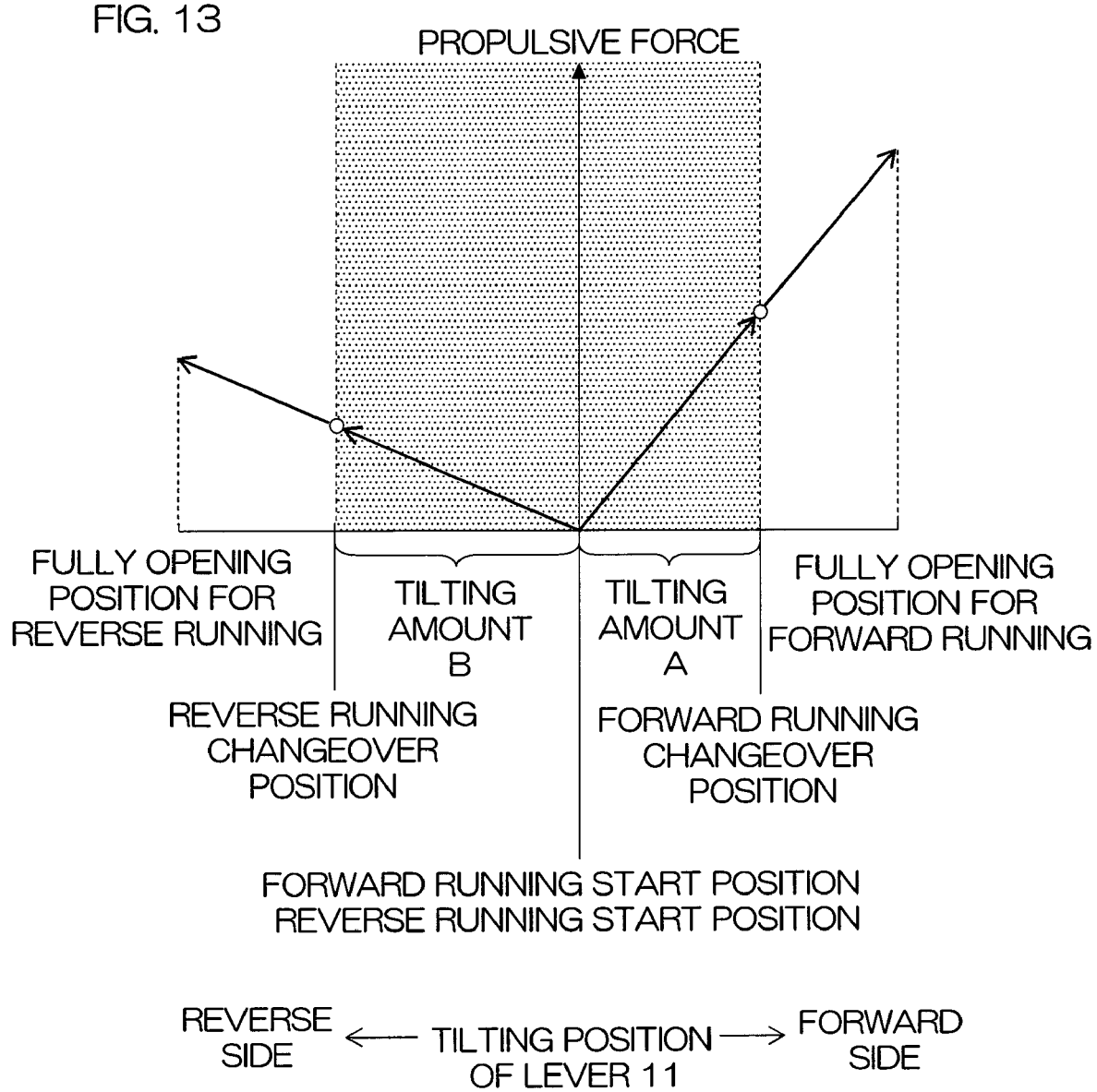
FIG. 13 is a graph showing an other example of the relationship between the lever tilting position and the propulsive force when the lever tilting amount from the reverse running start position to the reverse running changeover position is set to be greater than the lever tilting amount from the forward running position to the forward running changeover position.

FIG. 13 shows correction control in which the example shown in FIG. 12 is further modified.

In the modified version, second correction characteristics of the engine (refer to FIG. 9) are used instead of the first correction characteristics of the engine in association with reverse tilting of the lever 11. The second correction characteristics of the engine are characteristics in which when the tilting amount of the lever 11 from the neutral position is the same, the target rotational speed Ve' of the engine is determined so as to be equal to the target rotational speed Ve of the engine based on the normal engine characteristics.

Also, in the modified version, second correction characteristics of the motor (Refer to FIG. 9) are used instead of the first correction characteristics of the motor in association with reverse tilting of the lever 11. The second correction characteristics of the motor are characteristics in which when the tilting amount of the lever 11 from the neutral position is the same, the target rotational speed Vm' of the motor is determined so as to be less than the target rotational speed Vm of the motor based on the normal motor characteristics. In detail, the correction control section 69 calculates the target rotational speed Vm of the motor (basic value) by applying the reverse tilting amount of the lever 11 from the neural position to the normal motor characteristics. Furthermore, the correction control section 69 calculates the target rotational speed Vm' of the motor depending on the second correction characteristics of the motor by multiplying the target rotational speed Vm (basic value) of the motor by a correction coefficient that is less than about 1.0.

That is, the correction control section 69 sets the target rotational speed of the electric motor 31 to be low in advance, taking it into account the reduction in the propulsive force due to bubble entrainment when driving the propeller 14 by the engine 30, whereby the propulsive force of the propeller 14 by drive of the electric motor 31 and the propulsive force of the propeller 14 by drive of the engine 30 can be made continuous to each other at the reverse running changeover position. Therefore, since the propulsive force corresponding to the tilting position of the lever 11 can be smoothly output, uncomfortable feelings experienced by the operator and passengers can be alleviated.

Figure 14:
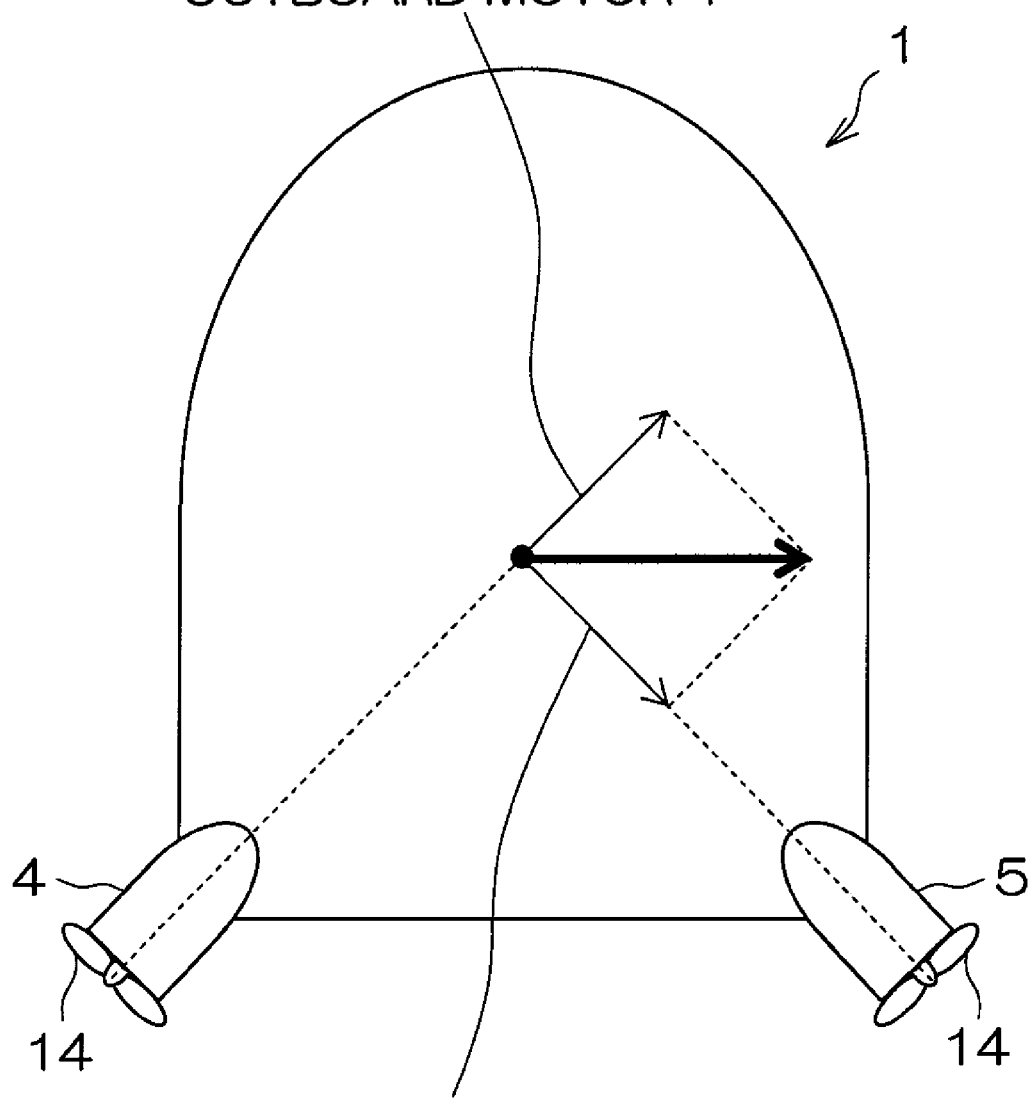
FIG. 14 is a conceptual view for describing a state where a marine vessel moves sideways.

FIG. 14 is a conceptual view showing conditions in which the marine vessel 1 moves sideways.

In the marine vessel 1 including a plurality of outboard motors 4 and 5, parallel movement (lateral movement) of the marine vessel 1 other than forward and reverse movements is enabled with a resultant force of the propulsive forces generated by the respective outboard motors 4 and 5 without turning the marine vessel 1. With such steering, arriving at and leaving from the shore can be further facilitated. For example, when the marine vessel 1 performs rightward lateral movement, in order to generate a propulsive force directed to the right side, a propulsive force directed right-forward is generated by the port-side outboard motor 4, and at the same time, a propulsive force directed right-reverse is generated by the starboard-side outboard motor 5. Therefore, the resultant force of these propulsive forces is directed rightward. At this time, the propeller 14 of the port-side outboard motor 4 is rotated in the forward direction, and the propeller 14 of the starboard-side outboard motor 5 is rotated in the reverse direction, whereby the rotation directions of the propellers 14 are opposite to each other. Accordingly, bubble entrainment occurs when the engine is driven at the starboard-side outboard motor 5 while no bubble entrainment occurs even when the engine is driven at the port-side outboard motor 4.

In such a case, normal control is performed for the port-side outboard motor 4, and correction control is performed for the starboard-side outboard motor 5, whereby since, in steering for lateral movement, the propulsive forces can be made continuous both when the motor is driven and when the engine is driven, the marine vessel 1 can be laterally moved in a direction intended by the operator during steering for lateral movement. Furthermore, uncomfortable feelings experienced by the operator and passengers are alleviated. Still further, as in the examples shown in FIG. 12 and FIG. 13 described above, the tilting amounts A and B of the lever when being changed over from motor drive to engine drive may be made different in the forward rotation and the reverse rotation of the propeller 14. Thereby, when steering for lateral movement at the dead slow area, changeover between motor drive and engine drive can be suppressed, whereby uncomfortable feelings experienced by passengers can be still further alleviated. Also, uncomfortable feelings due to bubble entrainment can be reduced while suppressing power consumption due to motor drive.

The present invention is not limited to the preferred embodiments described above, and may be embodied in other modes.

For example, in the examples of correction control shown in FIG. 12 and FIG. 13 described above, not only are the tilting amounts A and B of the lever, which define threshold values to change over motor drive and engine drive, made different from each other for forward rotation and reverse rotation but also the propulsive force by the tilting amount B of the lever is continuous. That is, at the tilting amount B of the lever, the propulsive force by motor drive and the propulsive force by engine drive are continuous to each other. However, a problem of discontinuance in the propulsive force at the dead slow area can be solved by making the tilting amount B of the lever, which is a threshold value for the reverse direction, greater than the tilting amount A of the lever which is a threshold value for the forward direction. Therefore, if discontinuance in the propulsive force outside the dead slow area is not important, there is no problem if the target rotational speeds Vm' and Ve' are established depending on the normal motor characteristics and the normal engine characteristics, not depending on the rotation direction of the propeller 14.

In addition, for example, the configuration in which two outboard motors are provided is illustrated in the preferred embodiments described above. However, such a configuration in which a single outboard motor is provided may be acceptable, or a configuration in which three or more outboard motors are provided may also be acceptable.

Furthermore, although, in the above-described preferred embodiments, the propulsive forces are generated by two modes that are the normal control mode and the correction control mode, the propulsive forces may be corrected in multiple stages by providing a plurality of correction control modes. Still further, the engine rotational speed may be controlled through feedback by numerically detecting lowering in the propulsive force.

Also, although, in the above-described preferred embodiments, the propulsive force is corrected by detecting changeover from forward running to reverse running, the propulsive force may also be corrected by detecting changeover from reverse running to forward running since a problem of bubble entrainment also occurs in changeover from reverse running to forward running.

A detailed description was provided of the preferred embodiments of the present invention. However, the preferred embodiments are only specific examples to describe the technical content of the present invention, and the present invention is not to be construed as limited to these specific examples. The spirit and scope of present invention is restricted only by the appended claims.

The present application corresponds to Japanese Patent Application No. 2006-305608 filed in the Japan Patent Office on Nov. 10, 2006, and the entire disclosure of the application is incorporated herein by reference.

What is claimed is:

1. An outboard motor control apparatus for controlling a hybrid type outboard motor including a propeller, an electric motor that generates a drive force to rotate the propeller, and an engine that generates a drive force to rotate the propeller, the engine discharging exhaust gas in water, the outboard motor control apparatus comprising:
   a speed instruction unit arranged to generate a speed instruction value indicative of a rotational speed of the propeller; and
   a control unit arranged to change from a first mode, in which only the drive force of the electric motor is transmitted to the propeller, to the second mode, in which the drive force of the engine is transmitted to the propeller, depending on a rotation direction of the propeller and the speed instruction value generated by the speed instruction unit; wherein
   the control unit is arranged to change from the first mode to the second mode by applying different threshold values to the speed instruction value generated by the speed instruction unit depending on the rotation direction of the propeller.

2. The outboard motor control apparatus for a hybrid type outboard motor according to claim 1, wherein the control unit uses a first threshold value when the rotation direction of the propeller is a first rotation direction along which in-water exhaust of the engine is moved away from the propeller and uses a second threshold valve, which is greater than the first threshold value, when the rotation direction of the propeller is a second direction along which the in-water exhaust of the engine is dragged to the propeller.

3. The outboard motor control apparatus for a hybrid type outboard motor according to claim 1, wherein, when the rotation direction of the propeller is a first rotation direction along which in-water exhaust of the engine is moved away from the propeller, the control unit executes control in the first mode when the speed instruction value generated by the speed instruction unit is not more than a first threshold value, and executes control in the second mode when the speed instruction value generated by the speed instruction unit exceeds the first threshold value, and when the rotation direction of the propeller is a second rotation direction along which the in-water exhaust of the engine is dragged to the propeller, the control unit executes control in the first mode when the speed instruction value generated by the speed instruction unit is not more than a second threshold value, which is greater than the first threshold value, and executes control in the second mode when the speed instruction value generated by the speed instruction unit exceeds the second threshold value.

4. The outboard motor control apparatus for a hybrid type outboard motor according to claim 3, further comprising:
   a direction instruction unit arranged to generate a direction instruction indicative of the rotation direction of the propeller; wherein
   when the direction instruction generated by the direction instruction unit indicates the first rotation direction, the control unit executes control in the first mode when the speed instruction value is not more than the first threshold value, and executes control in the second mode when the speed instruction value exceeds the first threshold value; and
   when the direction instruction generated by the direction instruction unit indicates the second rotation direction, the control unit executes control in the first mode when the speed instruction value is not more than the second threshold value, and executes control in the second mode when the speed instruction value exceeds the second threshold value.

5. The outboard motor control apparatus for a hybrid type outboard motor according to claim 2, wherein the first rotation direction is a forward direction in which a propulsive force in the forward direction is provided to a marine vessel, and the second rotation direction is a reverse direction in which a propulsive force in the reverse direction is provided to the marine vessel.

6. The outboard motor control apparatus for a hybrid type outboard motor according to claim 5, wherein the in-water exhaust of the outboard motor is discharged rearward of a marine vessel.

7. The outboard motor control apparatus for a hybrid type outboard motor according to claim 1, further comprising:
   a direction instruction unit arranged to generate a direction instruction indicative of the rotation direction of the propeller; wherein
   the control unit includes a rotation direction judging unit that determines the rotation direction of the propeller based on the direction instruction generated by the direction instruction unit.

8. The outboard motor control apparatus for a hybrid type outboard motor according to claim 1, further comprising:
   an electric motor rotational speed setting unit arranged to set a target rotational speed of the electric motor such that the propulsive force generated by the propeller is made continuous before and after the changing from the first mode to the second mode.

9. The outboard motor control apparatus for a hybrid type outboard motor according to claim 1, further comprising:
   an engine rotational speed setting unit arranged to set a target rotational speed of the engine such that the propulsive force generated by the propeller is continuous before and after the changing from the first mode to the second mode.

10. A marine vessel running support system, comprising:
   a hybrid type outboard motor including a propeller, an electric motor that generates a drive force to rotate the propeller, and an engine that generates a drive force to rotate the propeller, the engine discharging exhaust gas in water; and
   the outboard motor control apparatus according to claim 1, that controls the hybrid type outboard motor.

11. A marine vessel, comprising:

a hull;

a hybrid type outboard motor including a propeller;

an electric motor that generates a drive force to rotate the propeller; and an engine that generates a drive force to rotate the propeller, the engine discharging exhaust gas in water; and the outboard motor control apparatus according to claim 1, that controls the hybrid type outboard motor.

* * * * *